(12) United States Patent
Uchida

(10) Patent No.: US 6,704,467 B2
(45) Date of Patent: Mar. 9, 2004

(54) IMAGE EDITING WITH BLOCK SELECTION

(75) Inventor: Yoshiki Uchida, Newport Beach, CA (US)

(73) Assignee: Canon Kabushiki Kaisha, Tokyo (JP)

(*) Notice: Subject to any disclaimer, the term of this patent is extended or adjusted under 35 U.S.C. 154(b) by 575 days.

(21) Appl. No.: 09/741,184

(22) Filed: Dec. 21, 2000

(65) Prior Publication Data

US 2002/0081040 A1 Jun. 27, 2002

(51) Int. Cl.[7] .................................................. G06K 9/03
(52) U.S. Cl. ........................ 382/311; 345/619; 345/762; 345/764; 358/426.02; 358/453; 358/462; 358/538; 358/540; 382/175; 382/176; 382/180; 382/292
(58) Field of Search ................................ 345/619–621, 345/762–764; 358/426.02, 426.04, 452–453, 462, 537–540; 382/164, 175–177, 180, 292, 311

(56) References Cited

U.S. PATENT DOCUMENTS

| | | | |
|---|---|---|---|
| 4,978,226 A | * 12/1990 | Moriya et al. | 358/538 |
| 5,185,662 A | 2/1993 | Liston | 358/78 |
| 5,613,017 A | 3/1997 | Rao et al. | 382/174 |
| 5,729,628 A | 3/1998 | Tokuyama | 382/173 |
| 5,734,761 A | 3/1998 | Bagley | 382/309 |
| 5,790,708 A | 8/1998 | Delean | 382/276 |
| 5,825,944 A | 10/1998 | Wang | 382/309 |
| 5,828,782 A | 10/1998 | Sunakawa et al. | 382/173 |
| 5,852,685 A | 12/1998 | Shepard | 382/311 |
| 5,892,844 A | 4/1999 | Fujisawa | 382/177 |
| 5,949,555 A | * 9/1999 | Sakai et al. | 358/462 |
| 6,014,458 A | * 1/2000 | Wang | 382/176 |
| 6,476,821 B2 | * 11/2002 | Sawada et al. | 345/620 |

OTHER PUBLICATIONS

Shin–Ywan Wang; Yagasaki, T.; Document Analysis and Recognition, 1995., Proceeding of the Third International conference, on vol: 1, Aug. 14–16, 1995.*

* cited by examiner

Primary Examiner—Bhavesh M. Mehta
Assistant Examiner—Gregory Desire
(74) Attorney, Agent, or Firm—Fitzpatrick, Cella, Harper & Scinto

(57) ABSTRACT

Composing image data representing an original image in an image processing device, the image processing device having an input device and a display device, including performing a block selection process on the image data to identify at least one image block and to determine a set of block attribute data for each identified image block, displaying a composite image on the display device, the composite image comprised of each identified image block superimposed on the original image, receiving a block designation command from the input device, the block designation command designating one of the identified image blocks as a designated image block, and displaying, in response to the block designation command, a function command list for the designated image block, the function command list containing a plurality of function commands based on the set of block attribute data for the designated image block.

41 Claims, 15 Drawing Sheets

IMAGE EDITING WITH BLOCK SELECTION

INCORPORATION BY REFERENCE

Commonly-assigned U.S. patent application Ser. No. 09/458,941, entitled "Block Selection-Based Image Processing", filed Dec. 10, 1999, is incorporated by reference as if set forth in full herein.

BACKGROUND OF THE INVENTION

1. Field of the Invention

The invention concerns composing an image in an image composing system, such as a digital copier, by using block selection in conjunction with a user interface to allow the user to more efficiently identify different blocks of an image and to easily apply editing functions to selected ones of the blocks via the user interface.

2. Description of the Related Art

Typical copiers are comprised of a scanning operation in which an image is scanned from a document, and a printing operation in which the scanned image is printed a predetermined number of times according to the user's input from an input device such as a keypad or touch screen. Some copiers may also provide the user with the ability to perform some types of modifications to the scanned image before the scanned image is copied. In such a conventional copier system, certain functions are available for the user to modify the scanned image, including editing functions, such as cropping and moving portions of the scanned image. Other such functions include color conversion and contrast adjustment functions.

The ability of the user to perform these functions on the scanned image is often difficult due to the cumbersome user interface of such systems. For example, in order to apply such editing or color conversion functions, the user has to painstakingly identify the desired area of the scanned image to be modified. This identification is often performed by having the user input the boundary limits of the desired portion, such as the corners of the desired portion, so that the copier can designate such portion for editing and/or color conversion. The user must then find the desired function command from a series of function menus to apply to the designated area.

This process is typically cumbersome and prone to error for several reasons. First, there may not be a pre-view monitor available to assist the user in designating the desired area to be modified. Even if such a pre-view monitor is provided, such as a touch screen, it is difficult due to the size of the pre-view monitor for the user to determine a desired area for editing. It is also difficult for the user to accurately indicate the boundary of the desired area to the copier due to the size and resolution of the pre-view area. For example, it may be difficult for a user to accurately discern the boundary of an area in the scanned image which contains text from an area which contains a graphic image.

Second, once the user has designated a desired are to the copier, such as a block of text, the user must typically sort through a variety of function menus to find and select the desired editing or color conversion function. For example, if the user wishes to perform a "sharpen text" function on the designated block of text, the user must sort through a fixed, predetermined assortment of menus to find the desired function. This is often cumbersome because the fixed, predetermined assortment of menus include many other editing and/or color conversion functions which may have no relevance to the designated block. For instance, a color adjustment function may have no relevance to a block of the scanned image which contains only text.

The aforementioned problems with conventional copiers make the editing and/or color conversion of desired portions of a scanned image difficult for a user to perform, as well as time consuming. In addition, the foregoing problems can introduce errors due to the inability to accurately identify a particular portion of the scanned image for modification.

SUMMARY OF THE INVENTION

The present invention addresses the foregoing problems by allowing a user of an image composing system to more efficiently identify the different components of an image and to apply editing, color adjustment and other functions to selected components via a user interface. Specifically, the invention concerns composing an image by using a block selection process in conjunction with a user interface to allow the user to more efficiently identify different blocks of an image and to easily apply editing functions to the blocks via the user interface.

Accordingly, one aspect of the invention concerns composing image data representing an original image in an image processing device, the image processing device having an input device and a display device, including performing a block selection process on the image data to identify at least one image block and to determine a set of block attribute data for each identified image block, displaying a composite image on the display device, the composite image comprised of each identified image block superimposed on the original image, receiving a block designation command from the input device, the block designation command designating one of the identified image blocks as a designated image block, and displaying, in response to the block designation command, a function command list for the designated image block, the function command list containing a plurality of function commands based on the set of block attribute data for the designated image block.

Preferably, the plurality of functions are selected for inclusion in the function command list based on the set of attributes corresponding to the designated image block. The identified blocks are preferably displayed on a display device in conjunction with the scanned image for subsequent convenient designation by the user. Also, one of the plurality of function commands is preferably selected by the user and then a corresponding function is applied to the image data. The modified image data is then preferably sent to the printer for printing. The identified image blocks from the block selection process preferably include blocks based on text, photo, graphics, etc. Also, preferably, the plurality of functions includes editing functions and color conversion functions.

By virtue of the foregoing, the invention allows a block selection process to be used which automatically identifies the various blocks of the scanned image. In addition, an appropriate function list is generated and displayed which contains functions which are relevant and most likely to be used based on the type of designation image blocks.

According to another aspect, the invention concerns composing an image in an image copying apparatus, the image copying apparatus having a scanning device, a printing device, a display device and an input device, including scanning, by the scanning device, an original image to obtain image data corresponding to the original image, performing a block selection process on the image data to identify at least one image block and to determine a set of block attribute data for each identified image block, displaying a composite image on the display device, the composite image comprised of each identified image block superimposed on the original image, receiving a block designation command from the input device, the block designation command designating one of the identified image blocks as a designated image block, displaying, in response to the block designation command, a function command list for the designated image block, the function command list containing a plurality of function commands based on the set of block attribute data for the designated image block, receiving from the input device a selected function command from one of the plurality of function commands in the function command list, performing a function corresponding to the selected function command on a portion of the image data which corresponds to the designated image block so as to create modified image data, and sending the modified image data to the printing device for printing an image which corresponds to the modified image data.

Preferably, the plurality of function commands are selected for inclusion in the function command list based on the set of attributes corresponding to the designated image block. The identified image blocks are preferably displayed on a display device in conjunction with the scanned image for subsequent convenient designation by the user. Also, one of the plurality of function commands is preferably selected by the user with the input device and then a corresponding function is applied to the scanned image data. The identified image blocks from the block selection process preferably include image blocks based on text, photo, graphics, etc. Also, preferably, the plurality of function commands includes editing functions and color conversion functions.

By virtue of the foregoing, the invention allows a block selection process to be used which automatically identifies the various image blocks of the scanned image. In addition, an appropriate function command list is displayed containing function commands which are relevant and most likely to be used in response to a designation by the user of one of the types of blocks.

According to yet another aspect, the invention concerns composing an image in an image processing device having a display device, an input device, a scanning device and a printing device, including receiving, from the scanning device, image data corresponding to an original image, performing a first block selection process on the image data to identify at least one image block, and to identify a set of block attribute data corresponding to each identified image block, receiving a function command from the input device, the function command corresponding to a designated one of the image blocks, performing a function corresponding to the function command on a portion of the image data which represents the designated image block so as to generate modified image data, and performing a second block selection process on the modified image data to identify at least one image block, and to identify a set of block attribute data corresponding to each identified image block.

Preferably, the function command is based on the set of attributes corresponding to the designated image block. The identified image blocks are preferably displayed on a display device in conjunction with the scanned image for subsequent convenient designation by the user. Also, the function command is preferably input by the user and then a corresponding function is applied to the scanned image data. The identified image blocks from the block selection process preferably include image blocks based on text, photo, graphics, etc. Also preferably, the function command may correspond to an editing function or a color conversion function. The image data on which the block selection is performed is preferably of low resolution.

By virtue of the foregoing, the invention allows a block selection process to be used which automatically identifies the various blocks of the scanned image. In addition, a set of attributes for each identified image block is maintained throughout the editing process by using subsequent applications of the block selection process.

According to a final aspect of the invention, the invention concerns composing an image in an image copying apparatus, the image copying apparatus having a scanning device, a printing device, a display device and an input device, including scanning, by the scanning device, an original image to obtain image data corresponding to the original image, performing a first block selection process on the image data to identify at least one image block, and to determine a set of block attribute data for each identified image block, displaying a composite image on the display device, the composite image being comprised of each identified image blocks superimposed on the original image, receiving a block designation command from the input device, the block designation command designating one of the identified image blocks as a designated image block, displaying, in response to the block designation command, a function command list for the designated image block, the function command list containing a plurality of function commands based on the set of block attribute data for the designated image block, receiving a selected function command from the input device, the selected function command corresponding to the designated image block, performing a function corresponding to the selected function command on a portion of the image data which corresponds to the designated image block so as to create modified image data, performing a second block selection process on the modified image data to identify at least one image block, and to identify a set of block attribute data corresponding to each identified image block, and sending the modified image data to the printing device to print an image corresponding to the modified image data.

Preferably, the plurality of function commands are selected for inclusion in the function command list based on the set of attributes corresponding to the designated image block. The identified image blocks are preferably displayed on a display device in conjunction with the scanned image for subsequent convenient designation by the user. Also, one of the plurality of function commands is preferably selected by the user with the input device and then a corresponding function is applied to the scanned image data. The identified image blocks from the block selection process preferably include image blocks based on text, photo, graphics, etc. Also, preferably, the plurality of function commands includes editing functions and color conversion functions. The image data on which the block selection is performed is preferably of low resolution.

By virtue of the foregoing, the invention allows a block selection process to be used which automatically identifies the various image blocks of the scanned image. In addition, an appropriate function command list is displayed containing function commands which are relevant and most likely to be used in response to a designation by the user of one of the types of image blocks.

This brief summary has been provided so that the nature of the invention may be understood quickly. A more complete understanding of the invention can be obtained by reference to the following detailed description of the preferred embodiment thereof in connection with the attached drawings.

DETAILED DESCRIPTION OF THE PREFERRED EMBODIMENTS

The present invention relates to the editing and composing of images by using a block selection process in conjunction with a user interface to allow a user to more efficiently identify image blocks within an image and to easily apply editing functions to the designated image blocks via function commands displayed on the user interface.

Figure 1:
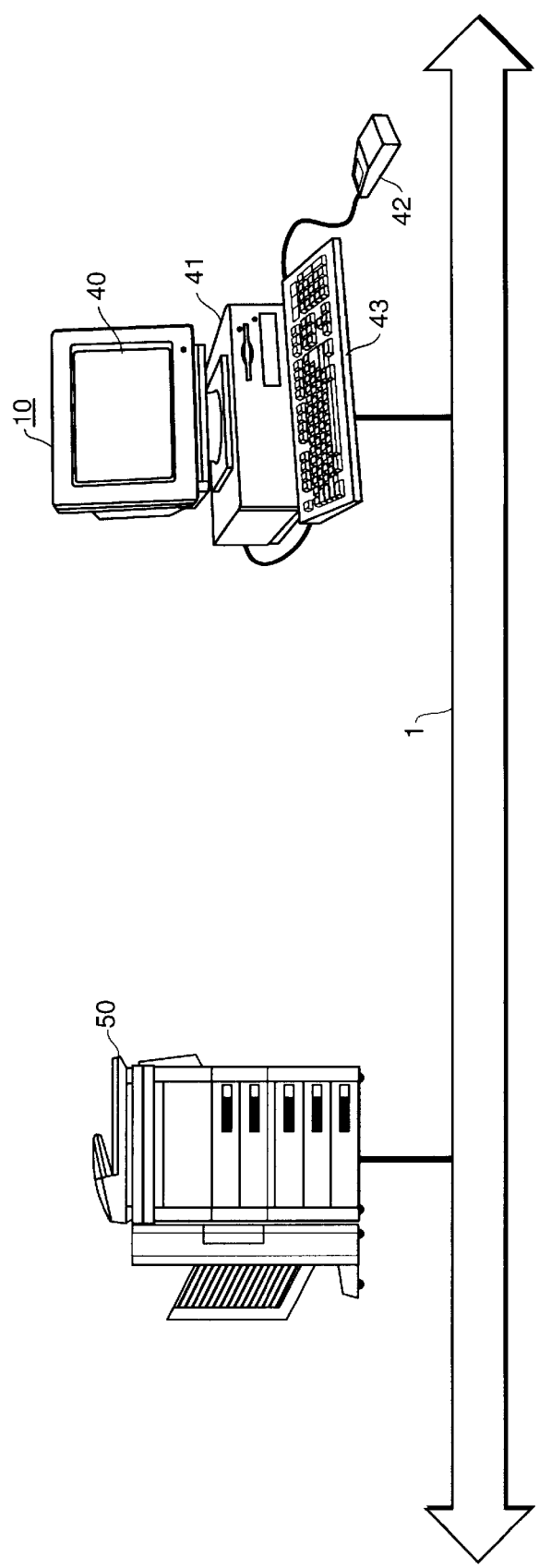
FIG. 1 is a block diagram which illustrates a network environment in which the present invention may be practiced.

FIG. 1 depicts a network environment in which the invention may be practiced. As seen in FIG. 1, network 1 has computer 10 and image processing apparatus 50 connected thereto. Preferably, the editing and composing of images according to the present invention can be performed by either a digital copy machine, such as image processing apparatus 50, or by a personal computer, such as computer 10. In this manner, images may be transferred in a networked environment, such as network 1, and then edited and composed by computer 10 or image processing apparatus 50. In addition, computer 10 and image processing apparatus 50 may interact such that an image that was composed on computer 10 may be transferred to image processing apparatus 50 for printing. Computer 10 is preferably a standard personal computer with display 40, host processor 41, pointing device 42 and keyboard 43. Image processing apparatus 50 will be discussed in more detail below.

Figure 2:
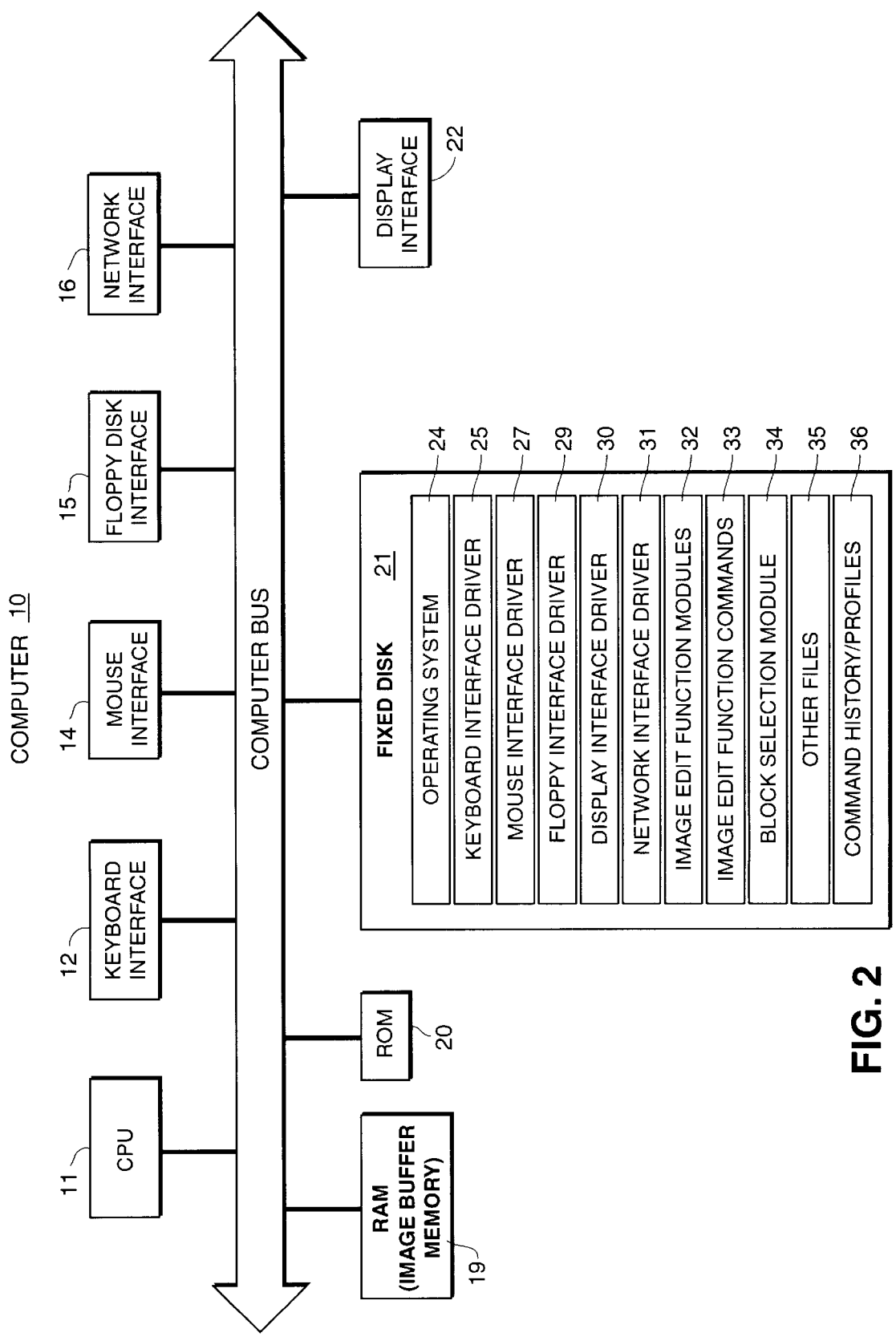
FIG. 2 is a representation of an internal architecture of the computer shown in FIG. 1 according to one embodiment of the present invention.

FIG. 2 is a block diagram showing an overview of the internal architecture of computer 10. In FIG. 2, computer 10 is seen to include central processing unit (CPU) 11 such as a programmable microprocessor which is interfaced to computer bus 17. Also coupled to computer bus 17 are keyboard interface 12 for interfacing to keyboard 43, mouse interface 14 for interfacing to pointing device 42, such as a mouse, floppy disk interface 15 for interfacing to a floppy disk, display interface 22 for interfacing to display 40, and network interface 16 for interfacing to network 1.

Random access memory ("RAM") 19 interfaces to computer bus 17 to provide central processing unit ("CPU") 11 with access to memory storage, thereby acting as the main run-time memory for CPU 11. In particular, when executing stored program instruction sequences, CPU 11 loads those instruction sequences from fixed disk 21 (or other memory media) into random access memory ("RAM") 20 and executes those stored program instruction sequences out of RAM 20. It should also be noted that standard-disk swapping techniques available under windowing operating systems allow segments of memory to be swapped to and from RAM 19 and fixed disk 21. Read-only memory ("ROM") 20 stores invariant instruction sequences, such as start-up instruction sequences for CPU 11 or basic input/output operation system ("BIOS") sequences for the operation of peripheral devices attached to computer 10. In addition, RAM 19 is used as an image buffer memory for storing image data during editing and composing of images according to one embodiment of the present invention.

Fixed disk 21 is one example of a computer-readable medium that stores program instruction sequences executable by central processing unit ("CPU") 11 so as to constitute operating system 24, keyboard interface driver 25 for driving keyboard interface 12, mouse interface driver 27 for driving mouse interface 14, floppy disk interface driver 29 for driving floppy disk interface 15, display interface driver 30 for driving display interface 22, network interface driver 31 for driving network interface 16. Image edit function modules 32 are modules for performing various edit and modification functions on image data. Image edit function commands 33 are commands that are used to initiate the application of one or more of image edit function modules 32 to image data. Block selection module 34 is used to perform a block selection process on image data to identify image blocks within an image. Block selection module 34 may perform a block selection process according to known methods and techniques. Image edit function modules 32, image edit function commands 33 and block selection module 34 are discussed in more detail below. Other files 35 is also provided to represent other data and program files that may be used during implementation of the present invention. Command history/profiles 36 is provided and utilized to track the historical use of commands for image editing and composition, both collectively and for identified users of computer 10. Command history/profiles 36 may also track and store user designated profiles of preferred commands for each user of computer 10.

As mentioned above, operating system 24 is preferably a windowing operating system, such as Windows 2000, Windows 98, Windows 95, and Windows NT, although other types of operating systems such as DOS, UNIX and LINUX may be used with the present invention.

Figure 3:
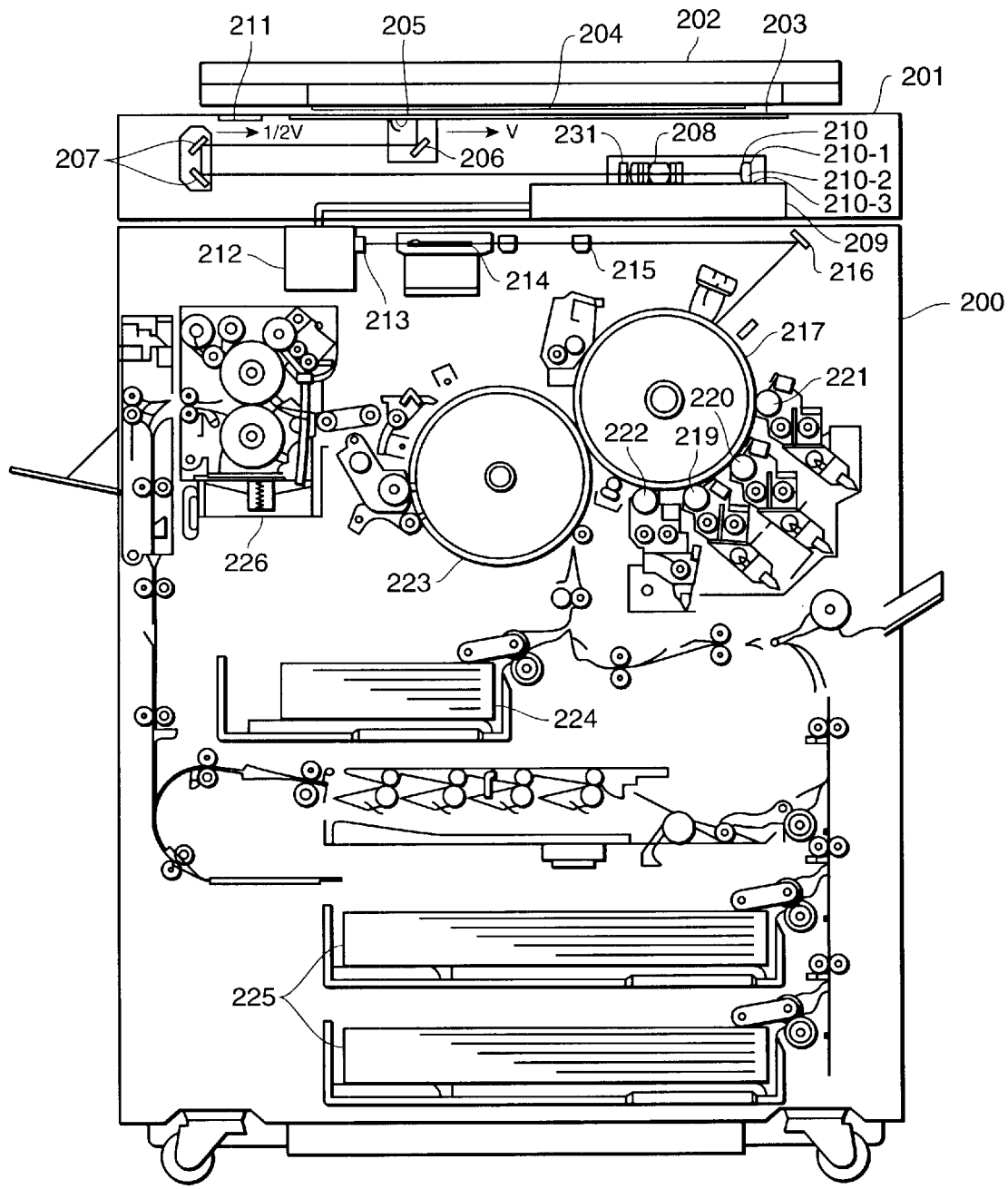
FIG. 3 is a side view of the internal architecture of an image processing apparatus according to one embodiment of the present invention.

FIG. 3 shows a sectional view of image processing apparatus 50 according to one embodiment of the present invention. In the apparatus of FIG. 3, image scanner 201 reads an original document, and digitally processes read pixel data of the original document into digital signals. Printer 200 then prints out an image corresponding to the original document read by image scanner 201 on a printing sheet in full color.

In image scanner 201, original document 204 is set on a platen glass, covered with a document cover 202, and exposed by halogen lamp 205. Reflected light from original document 204 is further reflected by mirrors 206 and 207, then focuses on CCD 210 for identifying R, G, and B signals after passing through the lens 208. It should be noted that lens 208 is covered by infrared filter 231.

In the preferred embodiment, each row of sensors in CCD 210 for reading respective color components is composed of 5000 pixels, thus CCD 210 can read across the shorter side of an A3-sized original, namely 297 mm, at 400 dpi resolution. CCD 210 separates color information of original document 204 into full-color information of R, G and B components, and converts the full-color information into color signals.

In addition, standard white board 211 generates correction data for correcting read data by R, G, B photo sensors 210-1 to 210-3 of CCD 210. Standard white board 211 has uniform reflection characteristics in the visible light range, and appears white. After correcting the data, CCD 210 then sends the signals to signal processing unit 209.

It should be noted that, halogen lamp 205 and mirror 206 move at speed v, and mirror 207 moves at speed (½)v in a perpendicular direction with respect to an electrical scanning direction of CCD 210 (a main scanning direction). The entire area of original document 204 is scanned in this manner.

Further, in signal processing unit 209, the read signals are electrically processed and separated into color components of magenta (M), cyan (C), yellow (Y), and black (Bk), then sent to printer 200. for each scanning operation by image scanner 201, one of the color component data of M, C, Y, and Bk is sent to printer 200. Thus, by scanning original document 204 four times, one color image is formed.

Image scanner 201 also includes control panel 228 (not shown in FIG. 3). Control panel 228 preferably includes various buttons as well as a display panel that provides a user with the ability to view a scanned image and to select and set various image processing options. The display panel may be a touch panel display from which the user can select processing options by touching a desired option on the display. Control panel 228 is discussed in more detail below.

Returning to FIG. 3, in printer 200, each image signal of M, C, Y, and BK from image scanner 201 is sent to laser driver 212. Laser driver 212 drives semi-conductor laser 213 by signals modulated on the basis of the image signals. The laser beam scans electrostatic drum 217 via polygon mirror 214, f-θ lens 215, and mirror 216.

The developer unit is composed of magenta developer 219, cyan developer 220, yellow developer 221, and black developer 222. These four drums touch electrostatic drum 217, are configured to turn therewith, and develop latent images of M, C, Y and Bk formed on electrostatic drum 217 with the corresponding color toner. Further, transfer drum 223 attracts a paper sheet fed from paper cassette 224 or 225, and a toner image developed on electrostatic drum 217 is transferred onto the paper sheet. The paper sheet is then ejected after passing through fixing unit 226.

Figure 4:
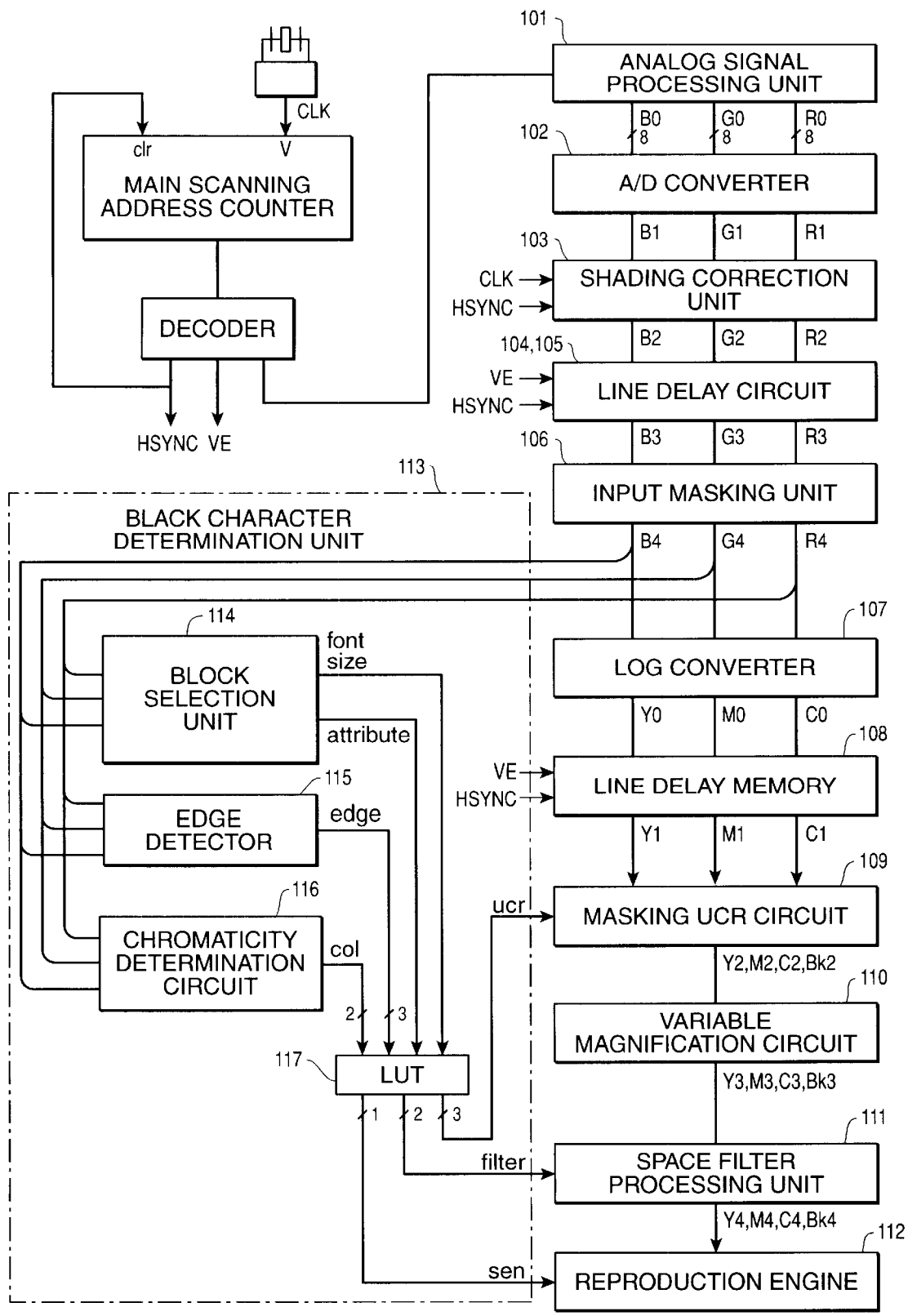
FIG. 4 is a block diagram for describing a process flow of the image processing apparatus according to one embodiment of the present invention.

FIG. 4 is a block diagram showing an image processing flow for image processing apparatus 50 according to the present invention. As shown in FIG. 4, image signals output from a CCD are input to analog signal processing unit 101, wherein the signal is processed with gain and offset adjustment. Next, each of the R, G and B signals is converted into an 8-bit digital image signal, R1, G1, and B1, respectively, by A/D converter 102. These signals are then input to shading correction circuit 103 for application of shading correction to each signal. Line delay circuits 104 and 105 are used to compensate for spacing of sensors within the CCD so as to match timing between each of the R1, G1 and B1 signals such that, after line delay circuit 105, values of the R, G and B signals at a same point in time represent a same pixel.

Input masking unit 106 converts a reading color space, determined by color decomposition characteristics of the CCD, into a standard color space, and log converter 107 converts luminance signals R4, G4 and B4 into density signals C0, M0 and Y0. The density signals are delayed by line delay memory 108 until determination signals UCR (under color removal), FILTER and SEN can be generated.

After delay of the signals by line delay memory 108, masking UCR circuit 109 extracts black signals from the density signals using the UCR signal and variable magnification circuit 110 expands and compresses an image signal and a black character determination signal in the main scanning direction. Space filter processing unit 111 performs filtering using the FILTER signal and the resulting frame-sequential image signals M4, C4, Y4 and Bk4 are sent to reproduction engine 112 along with the SEN signal, which determines the resolution at which the image is output.

The UCR, FILTER and SEN signals are output from black character determination unit 115. Specifically, the UCR signal generated by black character determination unit 113 has a value from 0 to 7 indicating, from more black to less black, an amount of black component which should be removed from signals Y1, M1 and C1 by masking UCR circuit 109 to produce signal Bk2. The FILTER signal produced by black character determination unit 113 is a 2-bit value in which values 0, 1, 2 and 3 indicate smoothing, strong edge enhancement, medium edge enhancement, and weak edge enhancement, respectively. Accordingly, the FILTER signal is input to space filter processing unit 111 to control an amount and type of filtering applied to signals Y3, M3, C3 and Bk3.

The SEN signal is output from black character determination unit 113 to reproduction engine 112, and is a 1-bit signal in which a 0 value indicates to engine 112 that printing should proceed at 200 lines per inch resolution, and the value 1 indicates that 400 lines per inch printing is required.

The values of UCR, FILTER and SEN are outputs of look-up table (LUT) 117, which receives signals indicating a width of a character containing a subject pixel, a proximity of the subject pixel to an edge of a character, and a chromaticity of the subject pixel. Therefore, the output values of UCR, FILTER, and SEN are calculated for each subject pixel and are determined based on a detected character width, edge proximity and chromaticity corresponding to the pixel according to relationships specified by the LUT.

For example, a FILTER signal value of 1 is used for a subject pixel which is located near to an edge, has low chromaticity and is included in a relatively thin character, since such factors suggest that the pixel is within a small, black character. In another example, the SEN signal is assigned a value of 0 (corresponding to 200 lines per inch resolution) in a case that the subject pixel is not near an edge and is included in a very thick area, since larger toner dots, which provide more toner per unit area than larger dots, generate a better halftone image.

Block selection unit 114 outputs signals representative of font size and attribute. Although block selection unit 114 appears in FIG. 3 as a hardware unit, it should be noted that the block selection processing described herein and in the applications incorporated by reference herein may be embodied in software or in a combination of software and hardware. Moreover, block selection unit 114 need not be an element of black character determination unit 113.

In operation, block selection unit 114 performs block selection processing on input image data to determine a font size of text in the data as well as attributes of various image block objects within the data. More particularly, for each pixel in input image data, block selection unit 114 assigns a font size of text, if any, in which the pixel is located and an attribute for an object in which the pixel is located.

LUT 117 takes as input signals font size, attribute, edge and col, and outputs signals UCR, FILTER and SEN. The detailed contents of LUT 117 are described in more detail in above-referenced commonly-assigned U.S. patent application Ser. No. 09/458,941, entitled "Block Selection-Based Image Processing."

Figure 5:
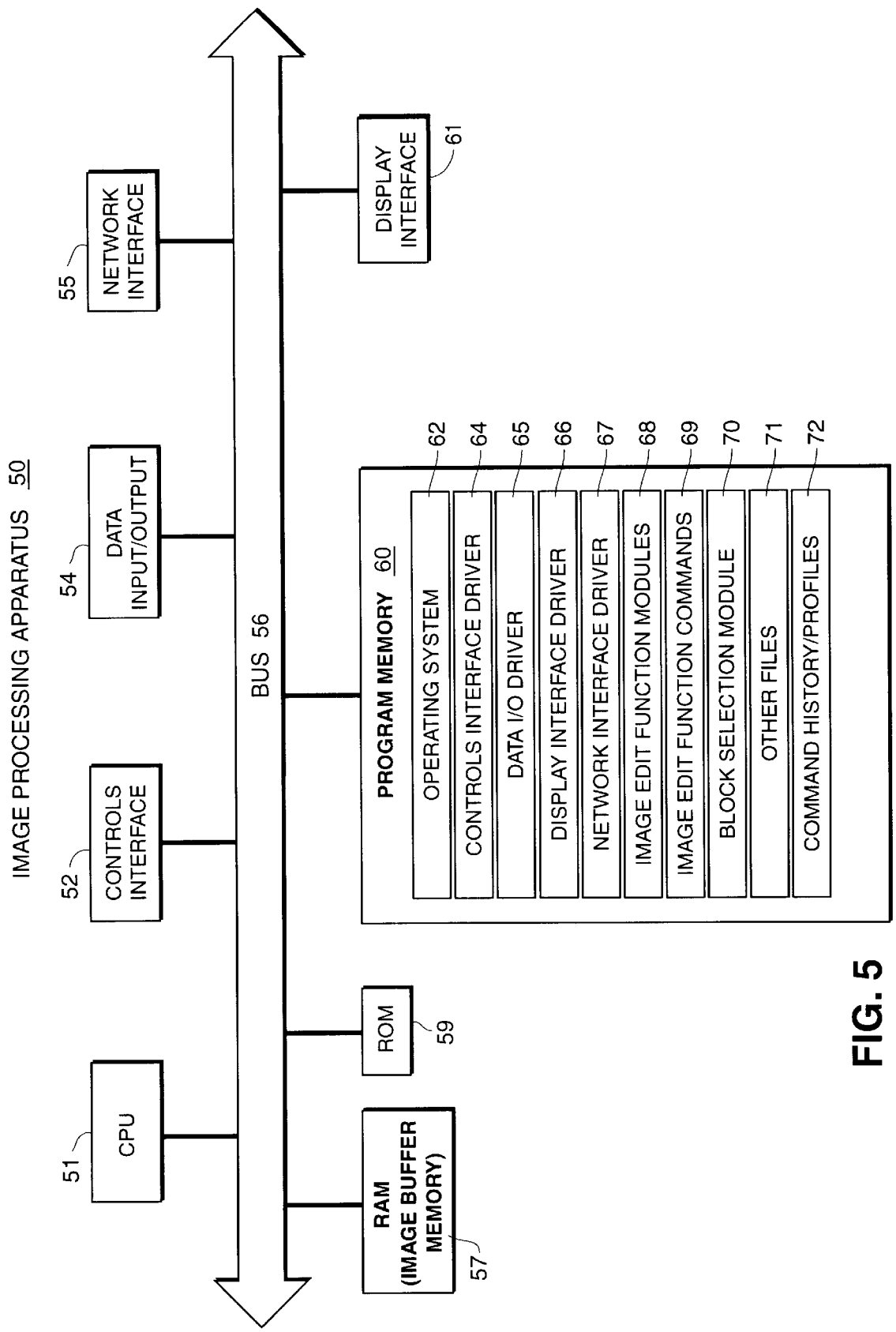
FIG. 5 is a representation of an internal computing architecture of the image processing apparatus shown in FIG. 1 according to one embodiment of the present invention.

FIG. 5 is a block diagram showing an overview of the internal architecture of image processing apparatus 50 according to one embodiment of the present invention. In this embodiment, a CPU is utilized in image processing apparatus 50 to perform processing on image data from a scanned document or other source, including processing such as block selection, editing and composing. Accordingly, the processor-based architecture of FIG. 5 may be used to perform these functions, as well as other functions depicted in FIG. 4. Of course, the functions in FIG. 4 may also be performed by hardware, or by a mix of hardware and software. As seen in FIG. 5, image processing apparatus 50 is seen to include central processing unit (CPU) 51 such as a programmable microprocessor which is interfaced to bus 56. Also coupled to bus 56 are controls interface 52 for interfacing to a control panel, data input/output 54 for transferring digital image data into and out of memory, such as RAM 57, display interface 61 for interfacing to a touch panel display in a control panel, and network interface 55 for interfacing to network 1.

Random access memory ("RAM") 57 interfaces to computer bus 56 to provide central processing unit ("CPU") 51 with access to memory storage, thereby acting as the main run-time memory for CPU 11. In particular, when executing stored program instruction sequences, CPU 51 loads those instruction sequences from program 60, which may be a read-only memory or a fixed disk (or other memory media) into random access memory ("RAM") 57 and executes those stored program instruction sequences out of RAM 57. It should also be noted that standard memory swapping techniques allow segments of memory to be swapped to and from RAM 57 and program memory 60. Read-only memory ("ROM") 59 stores invariant instruction sequences, such as start-up instruction sequences for CPU 51 or basic input/output operation system ("BIOS") sequences for the operation of any peripheral devices attached to image processing apparatus 50. In addition, RAM 57 is used as an image buffer memory for storing image data during editing and composing of images according to one embodiment of the present invention.

Program memory 60 is one example of a computer-readable medium that stores program instruction sequences executable by central processing unit ("CPU") 51 so as to constitute operating system 62, controls interface driver 64 for driving controls interface 52, data input/output interface driver 65 for driving data input/output 54, display interface driver 66 for driving display interface 61, and network interface driver 67 for driving network interface 55. Image edit function modules 68 are modules for performing various edit and modification functions on image data. Image edit function commands 69 are commands that are used to initiate the application of one or more of image edit function modules 68 to image data. Block selection module 70 is used to perform a block selection process on image data to identify image blocks within an image. Block selection module 70 may perform a block selection process according to known methods and techniques. Image edit function modules 68, image edit function commands 69 and block selection module 70 are discussed in more detail below. Other files 71 is also provided to represent other data and program files that may be used during implementation of the present invention. Command history/profiles 72 is provided and utilized to track the historical use of commands for image editing and composition, both collectively and for identified users of image processing apparatus 50. Command history/profiles 72 may also track and store user designated profiles of preferred commands for each user of image processing apparatus 50.

Figure 7:
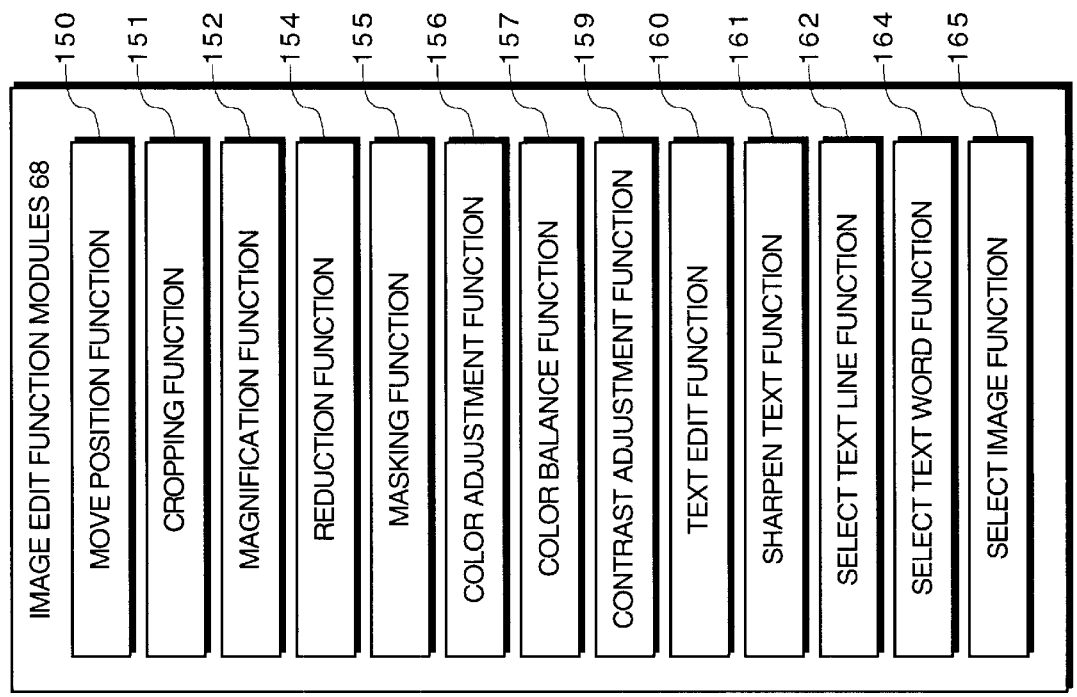
FIG. 7 is a block diagram for describing the image edit function module according to one embodiment of the present invention.
Figure 6:
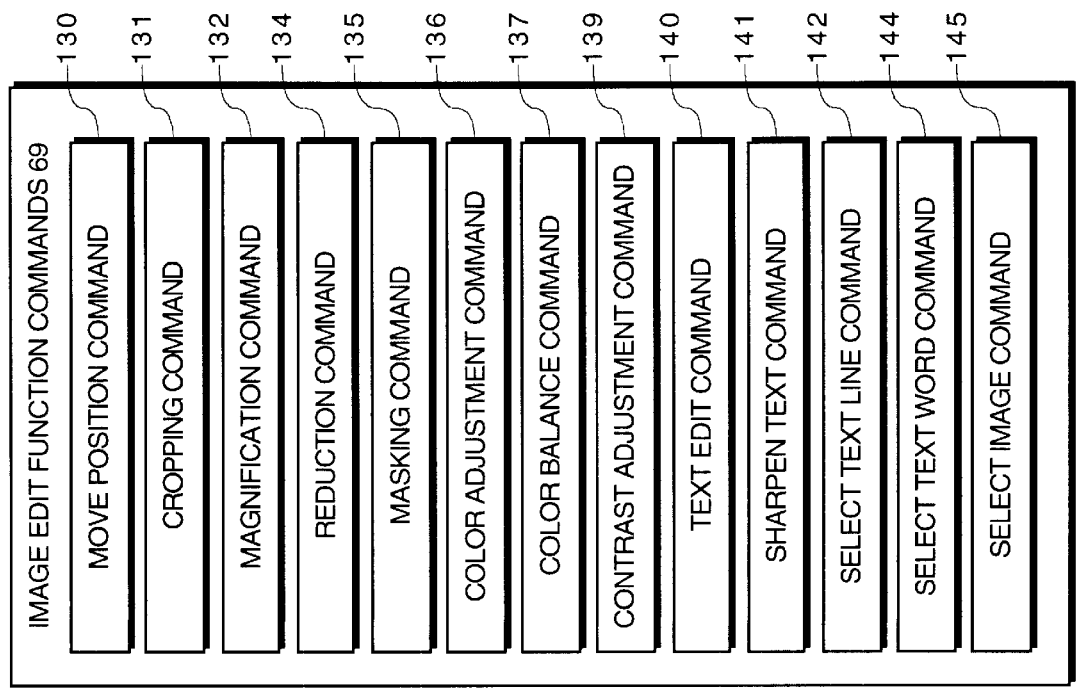
FIG. 6 is a block diagram for describing the image edit function commands according to one embodiment of the present invention.

FIG. 6 depicts image edit function commands 69 which are stored in program memory 60 of image processing apparatus 50, and which can be selected by a user from control panel 228 of image processing apparatus 50 to edit and/or compose an image. Similarly, FIG. 7 depicts image edit function modules 68 which are stored in program memory 60 of image processing apparatus 50, and which correspond to each of image edit function commands 69, respectively. Accordingly, when a user selects one of image edit function commands 69 from control panel 228 according to the present invention for application to a designated area of an image, the corresponding one of image edit function modules 68 is applied to the designated area to effect the desired edit/composition.

As seen in FIGS. 6 and 7, the image edit function commands 69 and image edit function modules 68 contain various commands, and their corresponding functions, for effecting different types of modifications to different types of image data. Specifically, move position command 130 implements move position function 150 in order to move the position of a designated image block of an image to a new location. Cropping command 131 implements cropping function 151 in order to crop the size of a designated image block of an image. Magnification command 132 implements magnification function 152 in order to magnify a designated image block of an image. Reduction command 134 implements reduction function 154 in order to reduce a designated image block of an image. Masking command 135 implements masking function 155 in order to mask a portion of a designated image block of an image. Color adjustment command 136 implements Color adjustment function 156 in order to adjust the color of a designated image block of an image. Color balance command 137 implements function 157 in order to balance the color of a designated image block of an image.

Contrast adjustment command 139 implements contrast adjustment function 159 in order to adjust the contrast of a designated image block of an image. Text edit command 140 implements text edit function 160 in order to edit text within a designated image block of an image. Sharpen text command 141 implements sharpen text function 161 in order to sharpen selected text within a designated image block of an image. Select text line command 142 implements select text line function 162 in order to select a line of text within a designated image block of an image for application of one or more of image edit function modules 68. Select text word command 144 implements select text word function 164 in order to select a word of text within a designated image block of an image for application of one or more of image edit function modules 68. Lastly, select image command 145 implements select image function 165 in order to select an image, such as an image scanned-in by image processing apparatus 50 or imported from computer 10, for application of one or more of image edit function modules 68 to one or more designated image blocks of the selected image.

Figure 8:
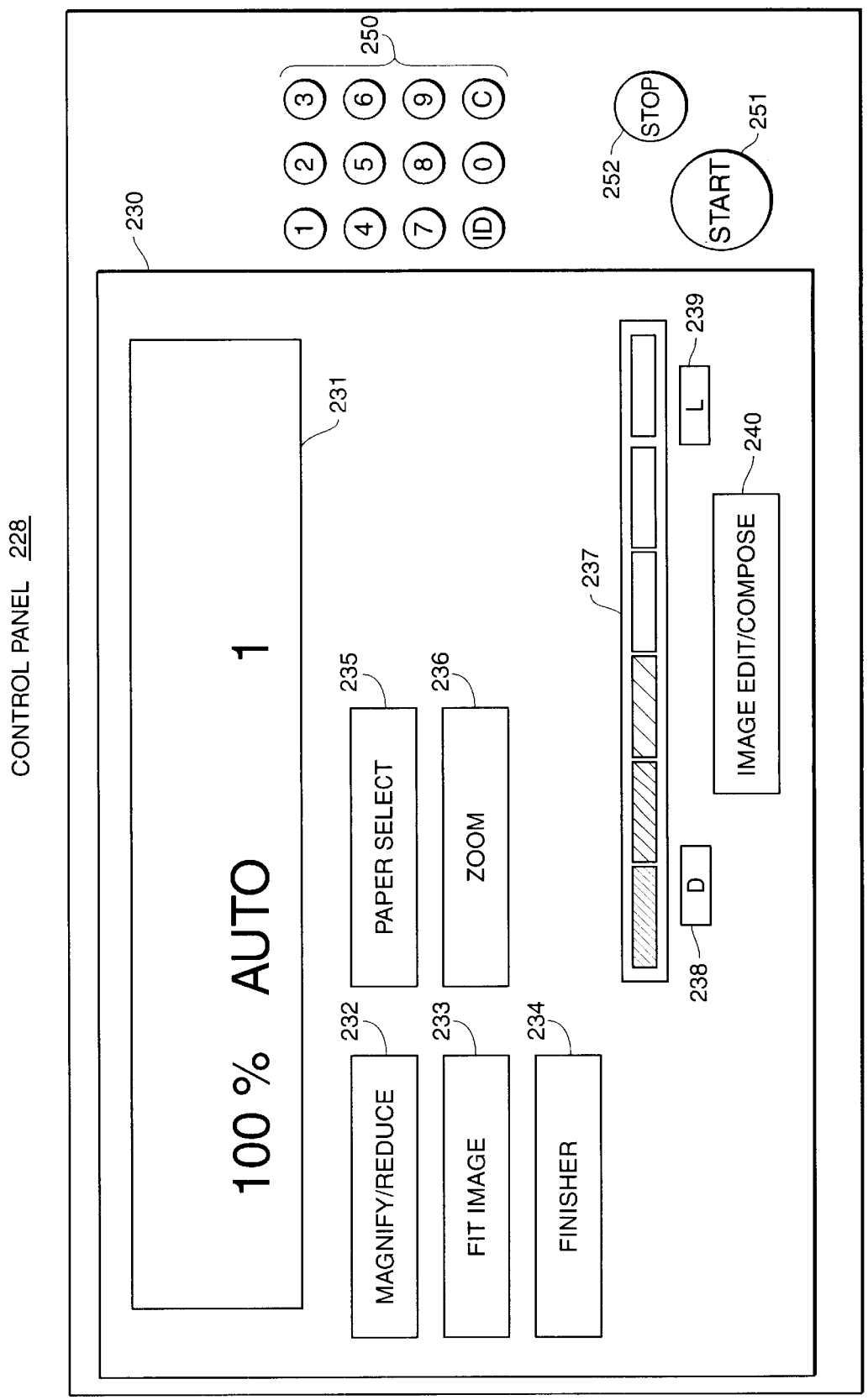
FIG. 8 is a block diagram for describing a top level display of a control panel on the image processing apparatus according to one embodiment of the present invention.

FIG. 8 depicts control panel 228 of image processing apparatus 50 according to one embodiment of the present invention. In particular, control panel 228 preferably is composed of touch panel display 230, keypad 250, start button 251 and stop button 252. Start and stop buttons 252 and 252 are used to start and stop a copy process of image processing apparatus 50. Keypad 250 is used to enter numbers, to enter an identification, and to clear a previous entry. Touch panel display 230 is provided for displaying various commands and for displaying a representation of a scanned or imported image when in an image edit/compose mode. When an image edit/compose mode is selected, touch panel display 230 allows a user to designate an area (image block) of the represented image and to select one or more displayed function commands so that corresponding functions may be applied to the designated area.

As seen in FIG. 8, touch panel display 230 displays a top level function menu for a user of image processing apparatus 50 to select and control a particular copy process for performing a copy job of one or more documents. In particular, touch panel display 230 of FIG. 8 includes options to magnify/reduce 232, to adjust an image to fit on the output paper size (fit image 233), to select an output paper size 235 (paper select; e.g. A3, A4, Letter, Legal, etc.), to zoom-in on a portion of the image (zoom 236), and to select a contrast of the document by referencing contrast bar 237 and dark/light buttons 238 and 239, respectively. and to zoom 304 to a specified percentage of the original document. Additionally, options to select an original document size 305 (e.g. A3, A4, Letter, Legal, etc.), select an output document size 306, select a color image 307 or a greyscale image 308 may be included. Further, options to select finishing options 310 such as collating and stapling, and two sided copying 311 may be included. Also, in the present invention, image edit/compose 240 is provided on the top level display depicted on touch panel display 230 in FIG. 8. A user selects image edit/compose 240 when the user wishes to edit or compose an image which has been scanned-in by image processing apparatus 50 or which has been imported to image processing apparatus 50 from an external source, such as from computer 10 via network 1.

Figure 9:
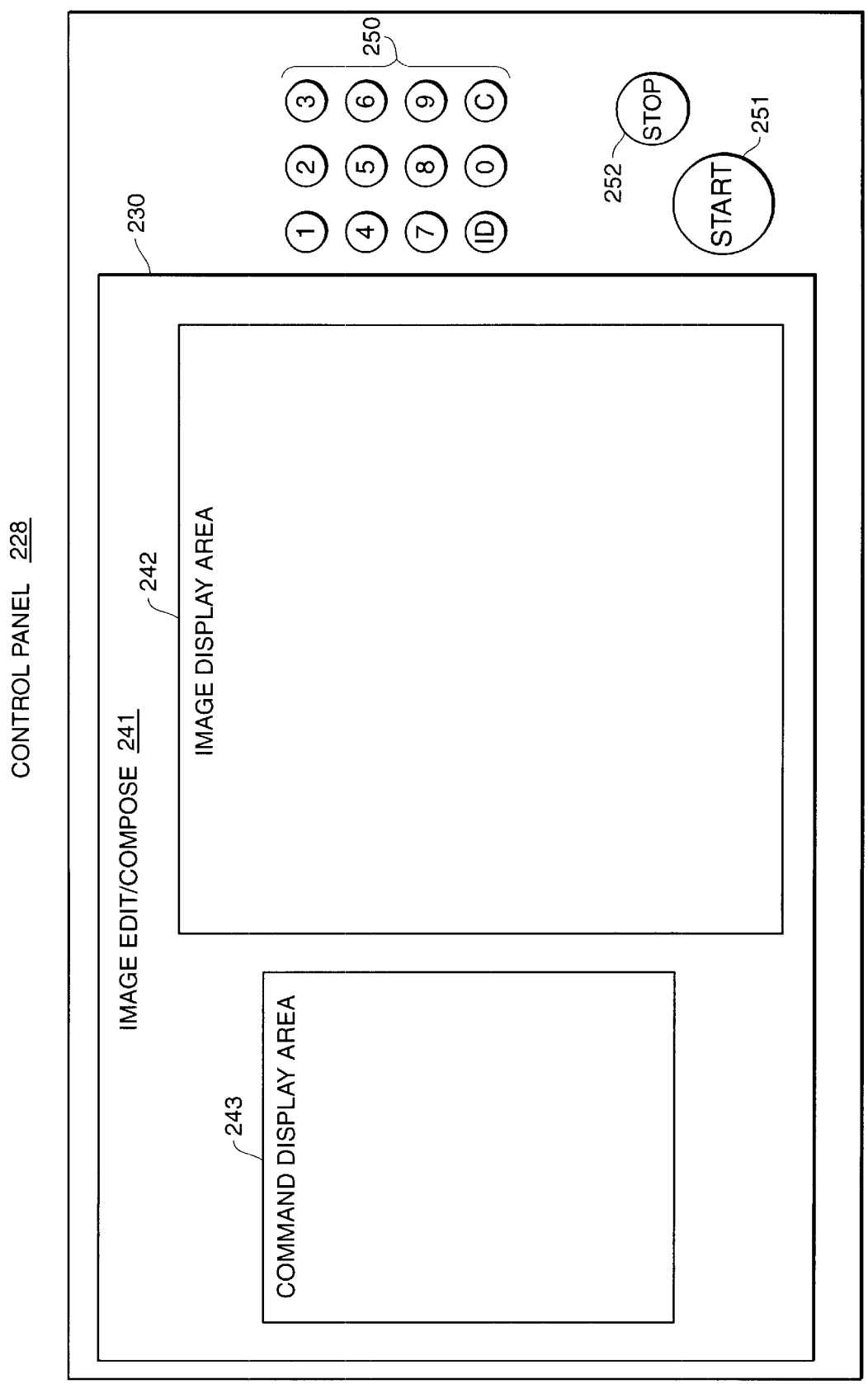
FIG. 9 is a block diagram for describing an image edit/compose display of a control panel on the image processing apparatus according to one embodiment of the present invention.

An example of image edit/compose display 241, which is displayed on touch panel display 230 when the user selects image edit/compose 240, is depicted in FIG. 9. As seen in FIG. 9, image edit/compose display 241 includes image display area 242 and command display area 243. Image display area 242 is provided to display a representation of a scanned-in image or of an imported image for editing/composition by the user. Command display area 243 provides an area for the display of one or more of image edit function commands 69. According to the present invention, when a representation of a scanned-in or imported image is displayed in image display area 242, a block selection process is performed on the image data to identify image blocks within the represented image. The image blocks correspond to areas within the represented image which contain particular types of image data. For example, one image block may contain only text, another image block may contain a color photo, another image block may contain line art, and yet another image block may contain color graphics. In addition, the block selection process, such as that performed by block selection module 70, also determines attributes corresponding to each identified image block, such as position within the represented image, image block type (text, photo, etc.), color, contrast and the like. As mentioned above, known block selection techniques may be applied such as those described in the patent application incorporated by reference above.

The resulting identified image blocks from the block selection process are superimposed on the represented image in image display area 242. A user can then select one of the image blocks by touching the screen in order to edit/compose the corresponding area of the image. A list of selected ones of image edit function commands 69 is displayed in command display area 243 in response to a designation of one of the image blocks by the user. The list of function commands is preferably selected based on the attributes of the designated image block. For example, if the user designates an image block in image display area 242 which is composed of text, then image processing apparatus 50 selects a list of function commands from image edit function commands 69 which pertain to text editing and modification, and then displays the list of function commands in command display area 243.

In this manner, a user of image processing apparatus 50 can quickly and efficiently view a representation of a scanned-in or imported image with image blocks of the represented image super-imposed thereon. When the user selects one of the image blocks, a function command list pops-up in command display area 243 having edit/compose functions that the user will most likely use for the type of designated image block. Thus, designation of a particular area of the image is easily made by simply touching one of the image blocks on touch panel display 230, thereby avoiding the tedious task of entering boundary locations of the desired area that the user wants to modify. In addition, the image edit function commands that are most likely to be used are determined and displayed for the user in command display area 243, thereby allowing the user to quickly select a desired edit/compose command without having to wade through a menu hierarchy to find the desired command.

Figure 10:
FIG. 10 is a block diagram for describing an image to be scanned and edited according to one embodiment of the present invention.

An example of a document having an image thereon for editing/composing according to the present invention is depicted in FIG. 10. Specifically, as seen in FIG. 10, document 300 is shown, which contains various different types of image areas. For example, a photograph is shown in area 310, a graph is shown in area 307, a table is shown in area 315, and text of various sizes and configurations is shown in other areas of document 300. According to the present invention, document 300 is placed on image scanner 201 of image processing apparatus 50 for scanning. In the alternative, an image of document 50, preferably rasterized, is provided from another source such as computer 10 via network 1. In any event, image data corresponding to document 50 is passed to RAM 57 in image processing apparatus 50. When the user of image processing apparatus 50 selects image edit/compose 240 on the top-level menu of touch panel display 230, the representation of document 300 is displayed in image display area 242 in the image edit/compose display 241 on touch panel display 230. Block selection is then performed, preferably by block selection module 70, on the image data corresponding to document 50 by CPU 51. As discussed above, the block selection process identifies image blocks in document 300 and then superimposes the outlines of the image blocks on the representation of the image from document 300 in image display area 242 on touch panel display 230.

Figure 11:
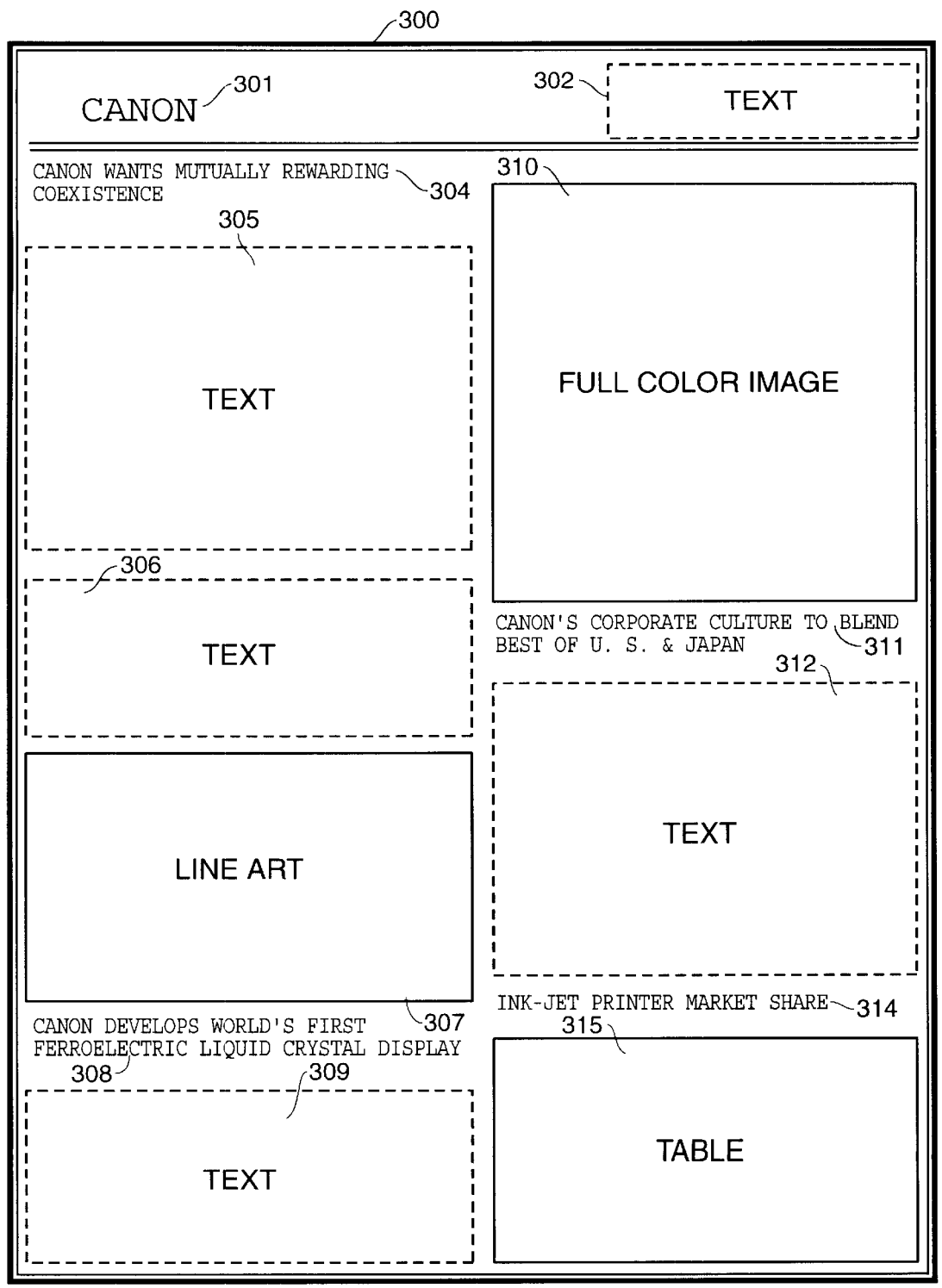
FIG. 11 is a block diagram for describing a composite image with identified image blocks according to one embodiment of the present invention.

FIG. 11 shows an example of the outlines of image blocks in the image of document 300 which are identified by the block selection process and for which attributes are determined. As seen in FIG. 11, the block selection process has identified that area 310 as contains a photograph, area 307 contains line art (graph), area 315 contains a table, and the other areas contain text. The outlines of these block areas are superimposed on the image of document 300 on touch panel display 230 to allow the user to easily identify each different portion of document 300 and to select one or more portions for editing/composing, as discussed above.

Figure 12:
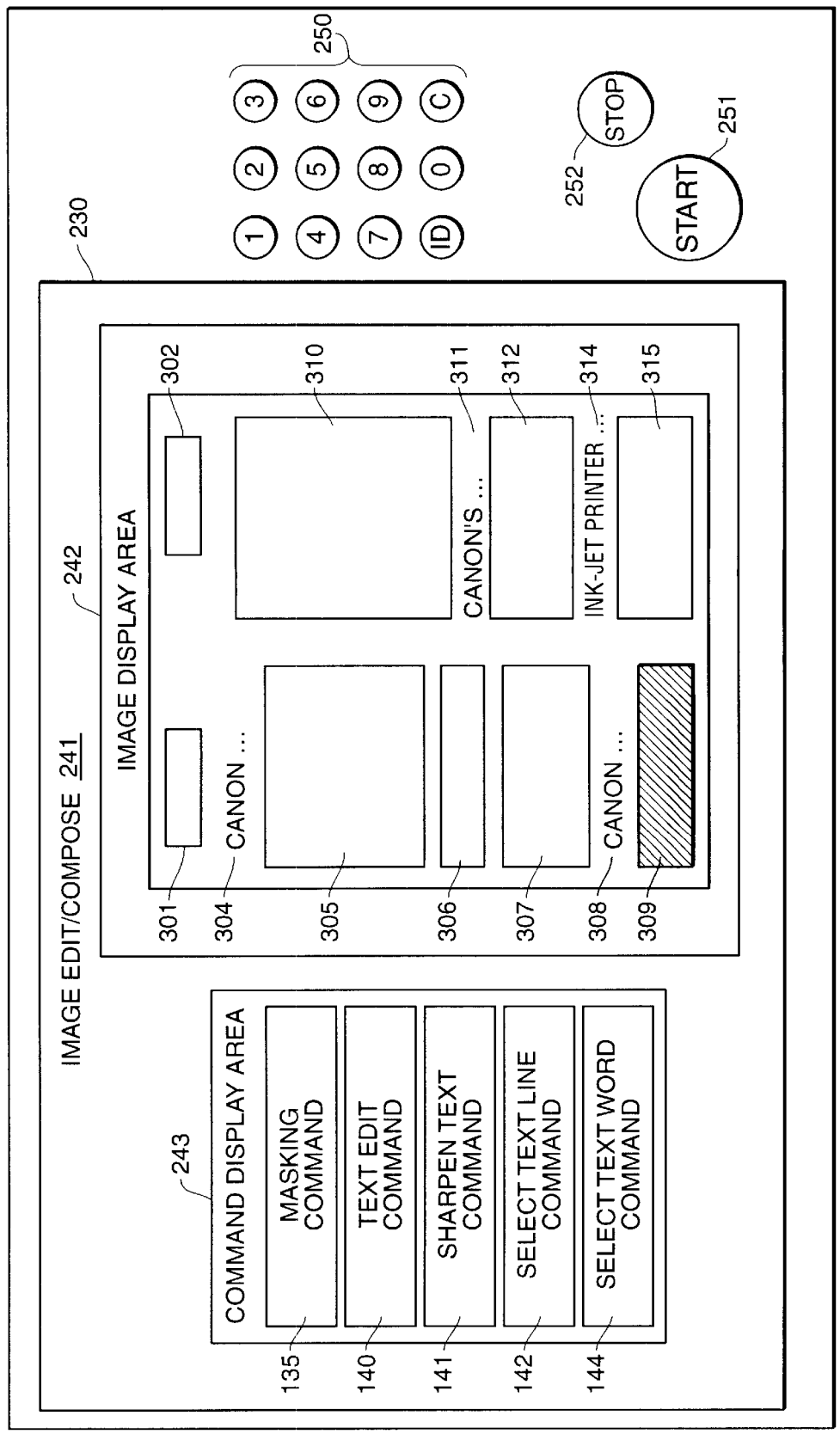
FIG. 12 is a block diagram for describing an image edit/compose display of a control panel on the image processing apparatus with a composite image and an edit function command list according to one embodiment of the present invention.

FIG. 12 shows an example of image edit/compose display 241 according to the present invention, in which the user has designated one of the image blocks of the represented image of document 300. As seen in FIG. 12, a representation of document 300 is depicted in image display area 242 in image edit/compose display 241 on touch panel display 230. The representation of document 300 also has superimposed thereon the outlines of the image blocks identified by the block selection process as shown in FIG. 11. In FIG. 12, it can be seen that the user has touched the touch panel display 230 at area 309 to designate that area 309 (shown in gray) as a designated image block for editing/composing by the user. As discussed above with respect to FIG. 11, area 309 corresponds to an area of document 300 which contains text. Upon selection, image processing apparatus 50 determines a list of function commands which are selected from image edit function commands 69. The list of function commands are selected from image edit function commands 69 based on the attributes of the image data in designated area 309, which were determined during the block selection process.

In this example, the attributes of area 309 indicate that it contains black and white text only. Accordingly, display interface drive 66 generates the list of function commands for display in command display area 242 which contains commands that correspond to text image data. As seen in FIG. 12, the command list displayed in command display area 242 pertains to edit/compose functions that are useful for image data containing text, such as masking command 135, text edit command 140, sharpen text command 141, select text line command 142, and select text word command 144. Of course, FIG. 12 is only one example of a command list for a designated image block displayed in image display area 242. It can be appreciated that another, unique command list would be generated based on the user's designation of another image block, such as area 310 which contains a image data for a photograph. In addition, it can be appreciated that the list of function commands in image edit function commands 69 is not an exclusive list and may include many other different types of image editing and color modification functions. Lastly, the commands which are listed in command display area 243 are selected and prioritized in an order which is based upon a predetermined probability that each command in image edit function commands 69 will be used for a particular type of designated image block. In the alternative, the commands which are listed in command display area 243 may be selected and prioritized based on a history of usage for each command in image edit function commands 69, which is tracked and maintained in command history/profiles 72. Lastly, the commands which are listed in command display area 243 may be selected and prioritized based on a profile for the particular user of image processing apparatus 50, based on a previously entered profile for the user of preferred function commands for particular types of designated image blocks. Such a previously-entered profiles is maintained in command history/profiles 72 and is accessed when the user enters a unique user identification into control panel 228 using keypad 250. In this manner, the set of edit/compose function commands that are most useful to the particular user for a particular type of designated image block are quickly determined and prioritized and displayed for access by the user.

Figure 13:
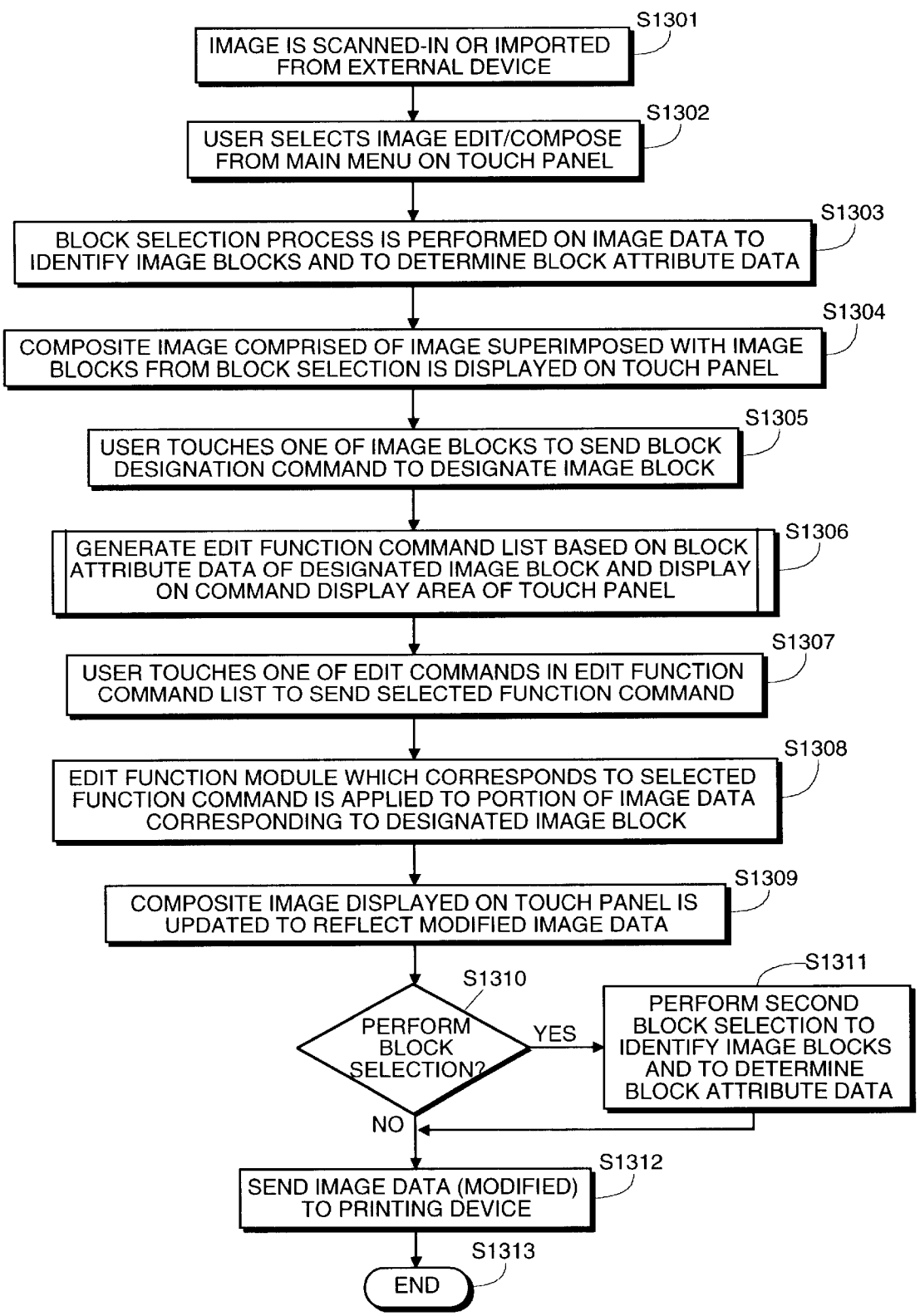
FIG. 13 is a flow chart for describing the editing and/or composing of image data corresponding to an image according to one embodiment of the present invention.

FIG. 13 is a flowchart for explaining the use of touch panel display 230 for applying edit function commands to an image according to one embodiment of the present invention. As seen in FIG. 13, an image is scanned-in or imported from an external device in step S1301. For example, image processing apparatus 50 may be used to scan-in document 300 as shown in FIG. 10. In the alternative, image data corresponding to an image may be received at image processing apparatus 50, such as from computer 10 via network 1. Preferably, the image data corresponding to the image is stored in RAM 57 which is used as an image buffer memory. Next, in step S1302, the user of image processing apparatus 50 selects the icon designated for image edit/compose 240 on the main menu display of touch panel display 230. Upon selection of image edit/compose 240, a black selection process is performed on the image data stored in RAM 57 so as to identify image blocks within the image data and to determine block attribute data for each of the identified image blocks. As seen in FIG. 5, block selection module 70 is executed in CPU 51 on the image data from RAM 57 in order to perform the block selection process. It can be appreciated that other software modules and/or hardware may be utilized to perform known techniques and methods for performing the block selection process to identify image blocks and corresponding block attribute data.

When the block selection process is complete, a composite image is displayed in image display area 242 of image edit/compose display 241 on touch panel display 230. The composite image is comprised of the original image represented by image data from RAM 57 along with the identified image blocks from the block selection process which are superimposed over the original image (step S1303). Next, as previously discussed with respect to FIG. 12, the user touches the area of touch panel display 230 over one of the displayed image blocks to designate that particular image block for subsequent editing and/or image processing (step S1305). In step S1306, an edit function command list is generated based on the block attribute data of the designated image block, and the edit function command list is then displayed in command display area 243 of image edit/ compose display 241 on touch panel display 230. Step 1306 is described in detail in the flowchart of FIG. 14.

Figure 14:
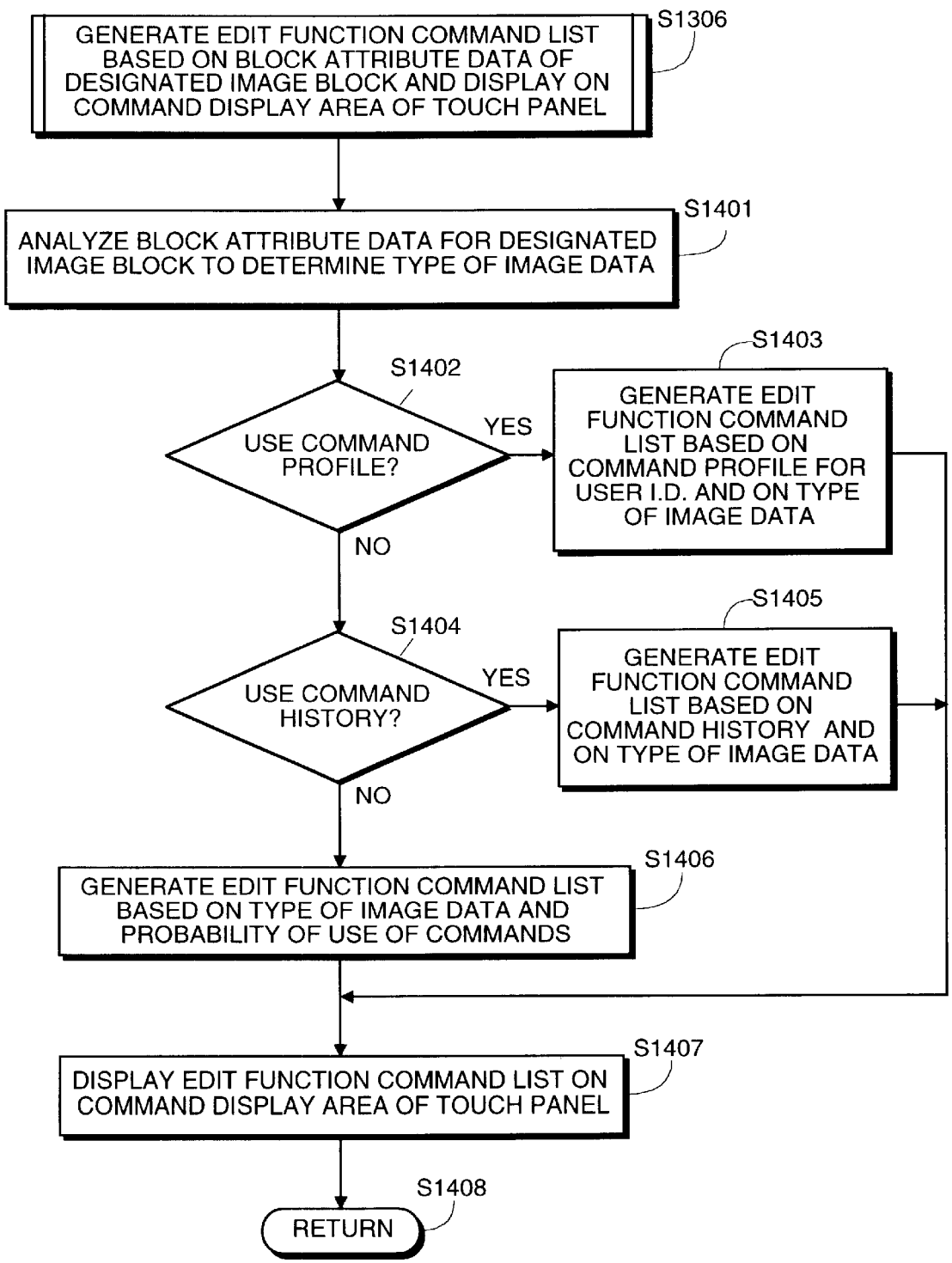
FIG. 14 is a flow chart for describing the editing and/or composing of image data corresponding to an image according to one embodiment of the present invention.

Turning to FIG. 14, the generation of an edit function command list begins in step S1401 by analyzing the block attribute data from the block selection process which corresponds to the designated image block in order to determine the type of image data within the designated image block. For example, if the user designates area 309 in image display area 242, as shown in FIG. 12, then the block attribute data corresponding to 309 is retrieved from either RAM 57 or other files 71 of program memory 60 in image processing apparatus 50. The block attribute data is analyzed to determine whether the type of image data in the corresponding designated image block is a photograph, text, line art, table, or other type of image data. In the example shown in FIG. 12, it is determined that the designated image block corresponding to area 309 contains text.

In step S1402, it is determined whether the user wishes to use a command profile in order to generate the edit function command list corresponding to the designated image block. For example, the user may have previously entered a particular list of edit commands that the user uses most often for a certain type of image data, such as a color photograph. Such a command profile is identified by user ID, which can be entered using keypad 250 of control panel 228. If the user has indicated that a command profile is to be used, then flow passes to step S1403 in which an edit function command list is generated based on the identified edit commands provided in the command profile for the user ID entered by the user of image processing apparatus 50 and based on the type of image data in the designated image block. For example, if the user selects area 310 of document 300 as a designated image block, then the command profile from command history/profiles 72 is retrieved from program memory 60 and those commands in the command profile that correspond to a photograph are retrieved and included in an edit function command list.

In this manner, the edit commands that the user has previously entered into a command profile for image data corresponding to a photograph are included in an edit function command list and then displayed in command display area 243 of touch panel display 230. If it is determined in step S1402 that the user does not wish to use a command profile, flow passes to step S1404. In step S1404, it is determined whether the user wishes to utilize the command history of each of image edit function commands 69 to generate an edit function command list. If it is determined in step S1404 that a command history is to be used, then flow passes to step S1405 in which command history/profiles 72 is accessed form program memory 60. In step S1405, the command history of each of image edit function commands 69 is analyzed to determine those function commands that have been most frequently used for the type of image data in the designated image block. For example, if the type of image data in the designated image block corresponds to a color photograph, then the command history may show that cropping command 131, color adjustment command 136, color balance command 137 and contrast adjustment command 139 are the commands that have historically been used most often in conjunction with color photograph image data. Accordingly, the foregoing commands are placed in an edit function command list for display. Of course, it can be appreciated that the foregoing example is only one example of a possible edit function command list for a particular type of designated image block.

If it is determined in step S1404 that the command history of each of image edit function commands is not to be used, then flow passes to step S1406 in which the edit function command list is generated based on the type of image data in the designated image block and also based on predetermined probabilities of use of each of image edit function commands 69. For example, each of image edit function commands 69 may have associated data stored with it which contains the predetermined probability of use for that command for each different type of image data. For example, color adjustment command 136 may have a high probability of being used for image data corresponding to a color photograph, but would correspondingly have a low probability of being used for image data corresponding to text. In this manner, only those edit function commands that are most likely to be useful based on the type of image data contained in the designated image block are provided in the generated edit function command list and displayed for use by the user. Next, in step S1407, which is reached after any one of steps S1403, S1405 or S1406, the generated edit function command list is displayed in command display area 243 of touch panel display 230. In this manner, those commands that are most useful to the user for a particular type of image block are collected automatically and displayed quickly in an area adjacent to the displayed image on touch panel display 230 for use by the user during subsequent editing and/or composition of the displayed image. Flow then passes to return in step S1408.

Returning to FIG. 13, the user touches one of the edit commands provided in the edit function command list displayed in command display area 243 in order to apply a desired edit function to the designated image block of the image data. For example, and as seen in FIG. 12, if the user has previously designated area 309 as the designated image block, then text-related commands are included in an edit function command list and displayed in command display area 243. In this manner, the user may select masking command 135 to mask a particular section of text in area 309. In the alternative, the user may select sharpen text command 141 to sharpen the text in area 309, or may select text edit command 140 to alter the text in area 309. If the user wishes to select a particular line of the text in area 309 for further editing and/or composition, the user may choose select text line command 142 to highlight one of the lines of text in area 309. The user can further refine the area of designation by choosing select text word command 144 to designate a particular word to which an edit function can be applied. Of course, the foregoing example is for a designated image block containing text only, and it can be appreciated that other unique edit function command lists are generated based on designated image blocks containing different types of image data.

In step S1308, the corresponding one of image edit function modules 68 is accessed based on the particular edit command which the user has selected from command display area 243 of touch panel display 230. For example, if the user has selected text edit command 140, then text edit function 160 is accessed from image edit function modules 68 and is applied to the portion of image data in RAM 57 which corresponds to the designated image block. In this manner, only the desired area of the image displayed in image display area 242 corresponding to the designated image block is modified by an edit function which the user has selected from command display area 243. Accordingly, image editing on image display apparatus 50 is performed in an efficient and intuitive manner by the user based on the use of identified image blocks from the block selection process and based on the automatically generated edit function command list displayed in command display area 243.

In step S1309, the composite image displayed in image display area 242 is updated to reflect the modified image data within the designated image block as a result of the edit function which has been applied to that designated image block. In this manner, the user can pre-view the effect of the edit function prior to printing out the modified image. In step S1310, it is determined whether or not a second block selection process is to be performed on the image data which has been modified by an edit function. In this regard, a current list of identified image blocks for the image is constantly maintained and updated based on the types of edits that are performed on the image data. For example, if the designated image block has been rotated, enlarged, reduced or had additional image blocks inserted or deleted, block selection is preferably performed again to re-identify all image blocks contained in the image data. However, if only the color of text within an image block has changed, or if other color or contrast changes have been made, then only the attribute data of each identified image block will be updated.

Accordingly, a current status of all identified image blocks after each edit function is applied, can be maintained with appropriate corresponding attribute data for each of the image blocks. This helps to ensure that identified image blocks correspond to modified image data and are appropriately displayed in image display area 242. A second block selection process also helps to ensure that the block attribute data corresponding to each identified image block is maintained in a current state so as to generate an appropriate edit function command list for display in command display area 243 for subsequent editing and/or composing. If it is determined in step S1310 that a second block selection process is to be performed on the image data, then the second block selection process is performed on the image data to identify image blocks and to determined block attribute data for each image block in step S1311. Flow then passes to step S1312, where the user indicates, for example by pressing start 251, that the editing and/or composing is complete so that the image data can be sent to the printing device of image processing apparatus 50 for printing an image which corresponds to the image data as modified by the user. Flow then passes to the end in step S1313. Accordingly, this embodiment of the present invention provides a quick and efficient way for a user of image processing apparatus 50 to pre-view a scanned or imported image, and to select desired areas of the image for application of editing and/or composition functions prior to printing the image.

The foregoing description is an example of one embodiment of the present invention in which the editing/composing of an image is carried out through a touch panel display of an image processing apparatus such as a copier. In such an embodiment, image edit function modules 68 are executed in CPU 51 in order to perform desired edit functions on image data stored in RAM 57. The logic for carrying out the display on touch panel display 230, and for initiating block selection module 70 and the appropriate ones of image edit function modules 68, is preferably performed by display interface driver 66, although other modules may be used.

In addition to the foregoing embodiment, the present invention as described above with regard to the flowcharts in FIGS. 13 and 14 may also be performed in a computing device for image processing, such as computer 10. As previously described with respect to FIG. 2, computer 10 also has corresponding software modules to those of image processing apparatus 50 for implementing the present invention. In this manner, an image may be scanned-in by image processing apparatus 50 and then transferred from RAM 57 of image processing apparatus 50 to RAM 19 of computer 10 for image processing in computer 10. Accordingly, the processing capabilities of image processing apparatus 50 are not tied-up while a user is editing an image, and the image can instead be edited at computer 10. In addition, image data corresponding to an image can also be retrieved from fixed disk 21 of computer 10, or from another external device such as a stand-alone scanner or from the internet.

Figure 15:
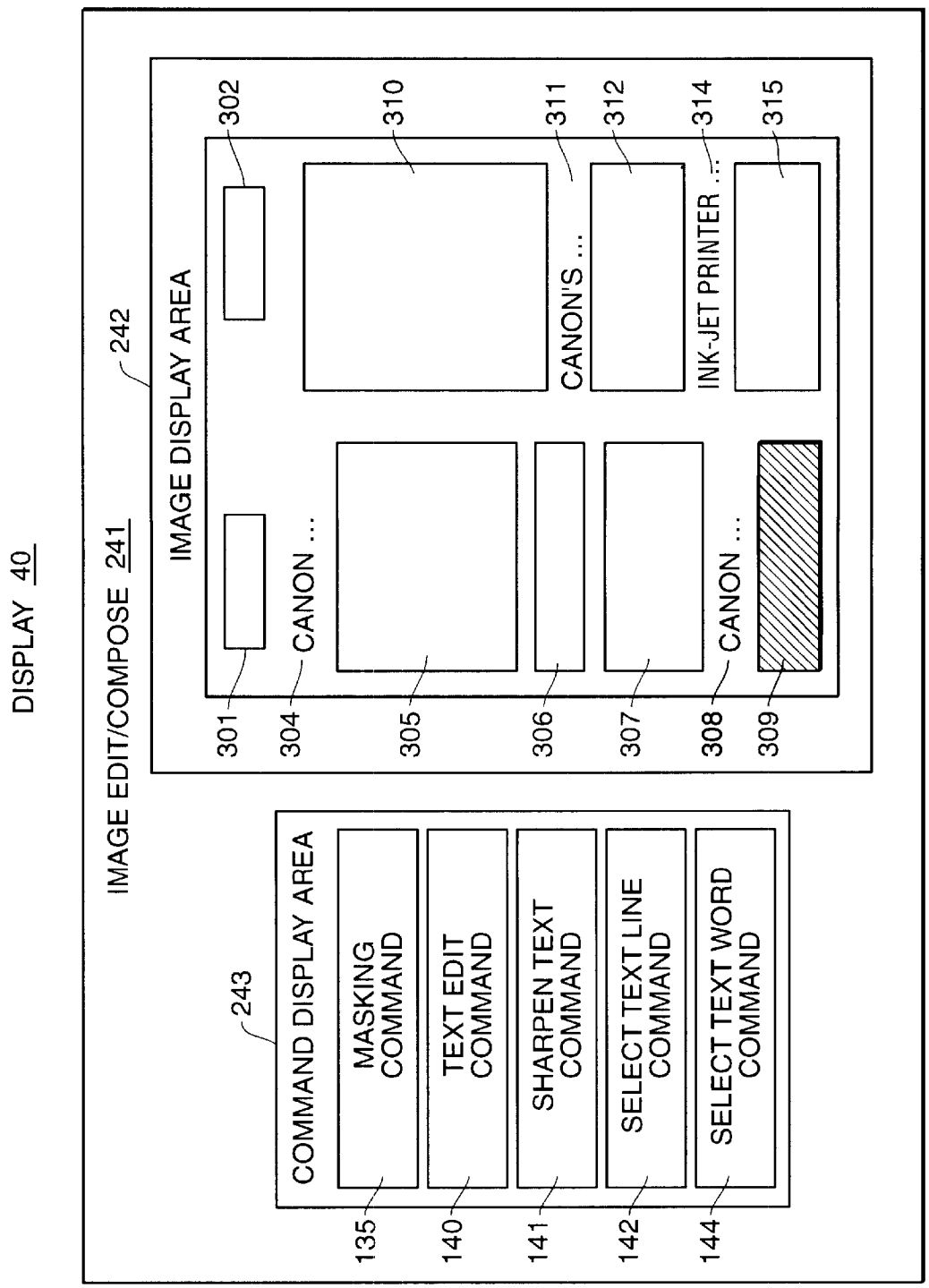
FIG. 15 is a block diagram for describing an image edit/compose display on a display of the computer shown in FIG. 1 according to one embodiment of the present invention.

Once an image is selected at computer 10 for editing and/or composing, the same steps of the flowcharts shown in FIGS. 13 and 14 apply to computer 10, thereby allowing a user of computer 10 to edit/compose an image on computer 10 in the same manner as that of image processing apparatus 50. Of course, the display 40 of computer 10 may be a touch screen display similar to that of touch panel display 230 of image processing apparatus 50 as depicted in FIGS. 9 and 12. In the alternative, a normal personal computer display and a pointing device, such as mouse 42, may be used to perform the editing and/or composing of an image in the same manner as previously described for image processing apparatus 50. FIG. 15 depicts an embodiment of the present invention which is practiced on computer 10.

As seen in FIG. 15, image edit compose display 242 is provided on display 40 of computer 10. Image edit compose display 242 is the same as that of touch panel display 230 shown in FIG. 12 and discussed above. In this manner, the aforementioned editing and composing of an image can be performed on computer 10, as well as on image processing apparatus 50. When the user is done editing and/or composing an image on computer 10, the modified image is sent to the printer of image processing apparatus 50 for printing via network 1, or to another printer for printing.

Figure 16:
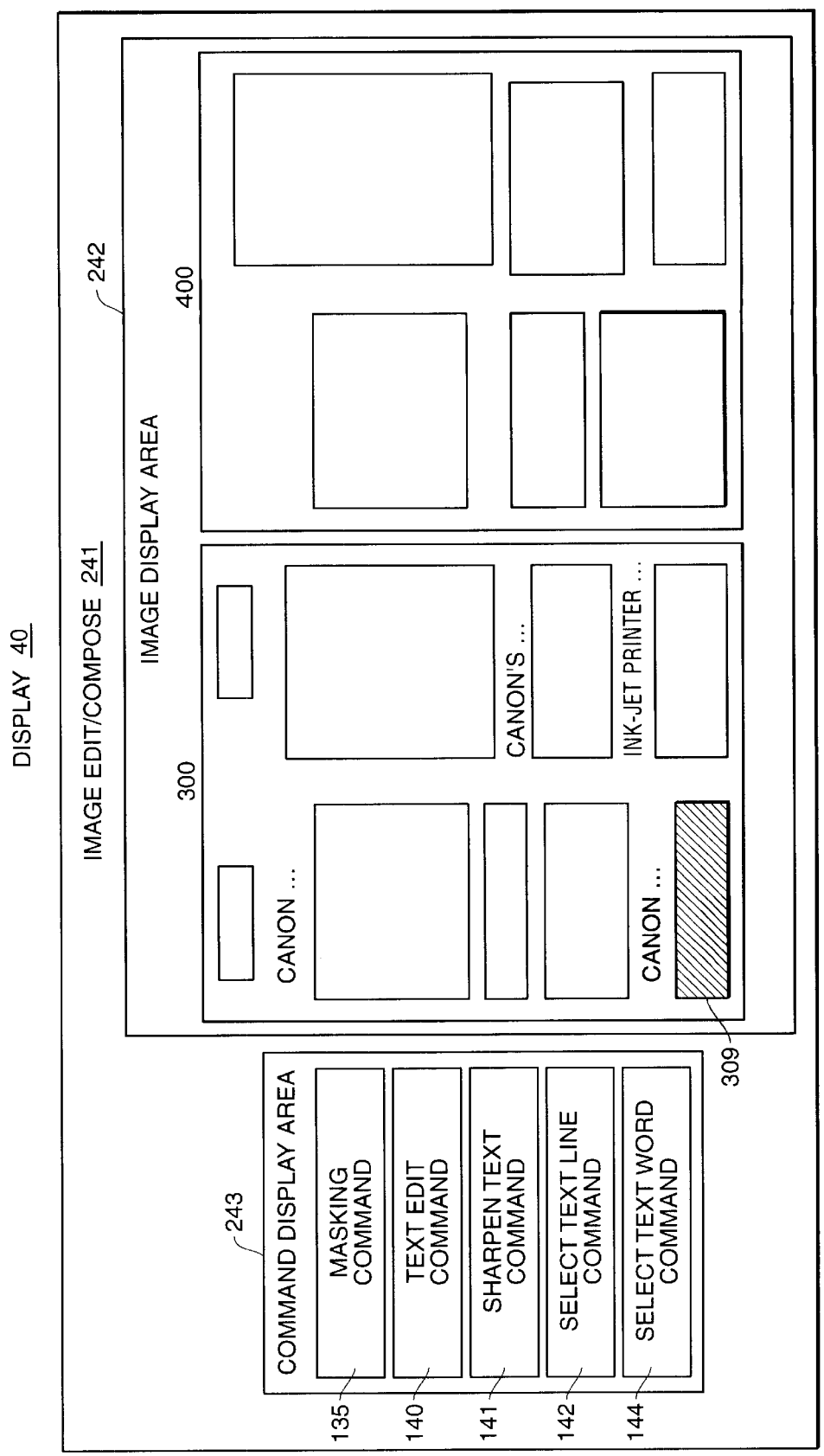
FIG. 16 is a block diagram for describing an image edit/compose display on a display of the computer shown in FIG. 1, for editing two images according to another embodiment of the present invention.

Another embodiment of the present invention is shown in FIG. 16, which is the same as that of FIG. 14 except that two images may be shown side-by-side for simultaneous image editing and/or composition. One of the images, such as image 300, may be obtained from image processing apparatus 50 via network 1 as described with the above embodiment. The other image, such as image 400, may be obtained from fixed disk 21 of computer 10 or from an internet site via network 1. Both images are stored in RAM 19 while the editing and/or composition process of the present invention is performed in the same manner as described in the flowcharts of FIGS. 13 and 14. In addition, move position command 130 can be used to move a designated image block from one image to another. When the image editing is complete, the user can send the modified image data to the printer device of image processing apparatus 50 for printing, or to anther printer.

The invention has been described with particular illustrative embodiments. It is to be understood that the invention is not limited to the above-described embodiments and that various changes and modifications may be made by those of ordinary skill in the art without departing from the spirit and scope of the invention.

What is claimed is:

1. A method for composing image data representing an original image in an image processing device, the image processing device having an input device and a display device, said method comprising:

performing a block selection process on the image data to identify at least one image block and to determine a set of block attribute data for each identified image block;

displaying a composite image on the display device, the composite image comprised of each identified image block superimposed on the original image;

receiving a block designation command from the input device, the block designation command designating one of the identified image blocks as a designated image block; and displaying, in response to the block designation command, a function command list for the designated image block, the function command list containing a plurality of function commands based on the set of block attribute data for the designated image block.

2. A method according to claim 1, further comprising the step of receiving from the input device a selected function command from one of the plurality of function commands in the function command list.

3. A method according to claim 2, further comprising the step of performing a function corresponding to the selected function command on a portion of the image data which corresponds to the designated image block so as to create modified image data.

4. A method according to claim 3, wherein the image processing device is connected to a printer, and further comprising the step of sending the modified image data to the printer for printing an image.

5. A method according to claim 3, further comprising the step of performing a second block selection process on the modified image data to identify at least one image block, and to identify a set of block attribute data corresponding to each identified image block.

6. A method according to claim 3, wherein the function is applied to a portion of the image data corresponding to a text line of the designated image block.

7. A method according to claim 3, wherein the function is applied to a portion of the image data corresponding to a word of the designated image block.

8. A method according to claim 3, wherein a modified image which corresponds to the modified image data is displayed on the display device.

9. A method according to claim 3, wherein the image data on which the block selection process is performed has a low resolution.

10. A method according to claim 1, wherein each set of block attribute data identifies an image data type corresponding to the respective identified image block.

11. A method according to claim 10, wherein the image data type corresponds to printed text.

12. A method according to claim 10, wherein the image data type corresponds to a graphic image.

13. A method according to claim 10, wherein the image data type corresponds to a photographic image.

14. A method according to claim 10, wherein the image data type corresponds to a halftone image.

15. A method according to claim 1, wherein the plurality of function commands contained in the function command list is prioritized in an order corresponding to a probability of use for each respective function command.

16. A method according to claim 1, wherein the display device is a monitor.

17. A method according to claim 1, wherein the display device is a liquid crystal display.

18. A method according to claim 1, wherein the input device is a keypad.

19. A method according to claim 1, wherein the input device is a keyboard.

20. A method according to claim 1, wherein the input device is a mouse.

21. A method according to claim 1, wherein the input device and the display device are combined in a touch screen display.

22. A method according to claim 1, wherein at least one of the plurality of function commands is an image editing function.

23. A method according to claim 22, wherein the image editing function is a moving function for moving the designated image block.

24. A method according to claim 22, wherein the image editing function is a cropping function for cropping the designated image block.

25. A method according to claim 22, wherein the image editing function is a masking function for masking the designated image block.

26. A method according to claim 22, wherein the image editing function is a magnification function for adjusting the magnification of the designated image block.

27. A method according to claim 1, wherein at least one of the plurality of function commands corresponds to a color adjustment function.

28. A method according to claim 1, wherein at least one of the plurality of function commands corresponds a contrast adjustment function.

29. A method according to claim 1, wherein the function commands contained in the function command list are selected and prioritized based on a usage history of each function command.

30. A method according to claim 1, wherein the function commands contained in the function command list are selected and prioritized based on an operator identification.

31. A method according to claim 1, wherein the image processing device receives the image data from a digital copying apparatus over a connection between the image processing device and the digital copying apparatus.

32. A method according to claim 31, wherein the connection is a network connection.

33. A method according to claim 31, wherein the connection is the internet.

34. A method according to claim 31, further comprising the steps of applying a function to the image data so as to create modified image data, and sending the modified image data to a printing device disposed in the digital copying apparatus to print an image.

35. A method according to claim 1, wherein the image processing device is an image copying apparatus which further includes a scanning device and a printing device, and wherein the method further comprises the steps of scanning an original image with the scanning device to obtain the image data, performing a function corresponding to a selected one of the function commands on a portion of the image data corresponding to the designated image block, and sending the image data to the printing device for printing.

36. A method for composing an image in an image copying apparatus, the image copying apparatus having a scanning device, a printing device, a display device and an input device, said method comprising the steps of:

scanning, by the scanning device, an original image to obtain image data corresponding to the original image;

performing a block selection process on the image data to identify at least one image block and to determine a set of block attribute data for each identified image block;

displaying a composite image on the display device, the composite image comprised of each identified image block superimposed on the original image;

receiving a block designation command from the input device, the block designation command designating one of the identified image blocks as a designated image block;

displaying, in response to the block designation command, a function command list for the designated image block, the function command list containing a plurality of function commands based on the set of block attribute data for the designated image block;

receiving from the input device a selected function command from one of the plurality of function commands in the function command list;

performing a function corresponding to the selected function command on a portion of the image data which corresponds to the designated image block so as to create modified image data; and sending the modified image data to the printing device for printing an image which corresponds to the modified image data.

37. A method for composing an image in an image processing device having a display device, an input device, a scanning device and a printing device, said method comprising:

receiving, from the scanning device, image data corresponding to an original image;

performing a first block selection process on the image data to identify at least one image block, and to identify a set of block attribute data corresponding to each identified image block;

receiving a function command from the input device, the function command corresponding to a designated one of the image blocks;

performing a function corresponding to the function command on a portion of the image data which represents the designated image block so as to generate modified image data; and performing a second block selection process on the modified image data to identify at least one image block, and to identify a set of block attribute data corresponding to each identified image block.

38. A method for composing an image in an image copying apparatus, the image copying apparatus having a scanning device, a printing device, a display device and an input device, said method comprising the steps of:

scanning, by the scanning device, an original image to obtain image data corresponding to the original image;

performing a first block selection process on the image data to identify at least one image block, and to determine a set of block attribute data for each identified image block;

displaying a composite image on the display device, the composite image being comprised of each identified image blocks superimposed on the original image;

receiving a block designation command from the input device, the block designation command designating one of the identified image blocks as a designated image block;

displaying, in response to the block designation command, a function command list for the designated image block, the function command list containing a plurality of function commands based on the set of block attribute data for the designated image block;

receiving a selected function command from the input device, the selected function command corresponding to the designated image block;

performing a function corresponding to the selected function command on a portion of the image data which corresponds to the designated image block so as to create modified image data;

performing a second block selection process on the modified image data to identify at least one image block, and to identify a set of block attribute data corresponding to each identified image block; and sending the modified image data to the printing device to print an image corresponding to the modified image data.

39. An image processing device for composing an image, the image processing device having a scanning device, a printing device, a display device and an input device, comprising:

a program memory for storing process steps executable to perform a method according to any of claims 1 to 38; and a processor for executing the process steps stored in said program memory.

40. Computer-executable process steps stored on a computer readable medium, said computer-executable process steps for composing an image in an image processing device, the image processing device having a scanning device, a printing device, a display device and an input device, said computer-executable process steps comprising process steps executable to perform a method according to any of claims 1 to 38.

41. A computer-readable medium which stores computer-executable process steps, the computer-executable process steps for composing an image in an image processing device, the image processing device having a scanning device, a printing device, a display device and an input device, said computer-executable process steps comprising process steps executable to perform a method according to any of claims 1 to 38.

* * * * *